US010552987B2

(12) United States Patent
Laroche et al.

(10) Patent No.: US 10,552,987 B2
(45) Date of Patent: Feb. 4, 2020

(54) ENCODING AND DECODING OF TEXTURE MAPPING DATA IN TEXTURED 3D MESH MODELS

(71) Applicant: CANON KABUSHIKI KAISHA, Tokyo (JP)

(72) Inventors: Guillaume Laroche, Saint Aubin D'Aubigne (FR); Patrice Onno, Rennes (FR); Christophe Gisquet, Acigne (FR)

(73) Assignee: Canon Kabushiki Kaisha, Tokyo (JP)

(*) Notice: Subject to any disclaimer, the term of this patent is extended or adjusted under 35 U.S.C. 154(b) by 18 days.

(21) Appl. No.: 15/910,990

(22) Filed: Mar. 2, 2018

(65) Prior Publication Data
US 2018/0253867 A1 Sep. 6, 2018

(30) Foreign Application Priority Data
Mar. 6, 2017 (GB) .................................. 1703556.9

(51) Int. Cl.
*G06T 15/00* (2011.01)
*G06T 9/00* (2006.01)
*G06T 17/20* (2006.01)
*G06T 15/04* (2011.01)

(52) U.S. Cl.
CPC .............. *G06T 9/001* (2013.01); *G06T 15/04* (2013.01); *G06T 17/20* (2013.01)

(58) Field of Classification Search
CPC .............................. H04M 10/20; H04M 10/24
USPC .......................................................... 345/419
See application file for complete search history.

(56) References Cited

U.S. PATENT DOCUMENTS 6,823,506 B1* 11/2004 Whitten .................. G06F 8/443
717/151
2014/0092439 A1* 4/2014 Krig ......................... G06T 9/001
358/2.1

FOREIGN PATENT DOCUMENTS

EP           2309648 A1    4/2011
WO     2013/107273 A1    7/2013

OTHER PUBLICATIONS

Zhu, J., Lossless Triangle Mesh Compression, Queen's University, Kingston, Ontario, Canada, Jul. 2013. [Online}, [Retrieved on May 15, 2019], Retrieved from the Internet: <URL: https://qspace.library.queensu.ca/bitstream/handle/1974/8131/Zhu_Junjie_201307_MSC.pdf?sequence=3> (Year: 2013).*

(Continued)

*Primary Examiner* — Gordon G Liu
(74) *Attorney, Agent, or Firm* — Canon U.S.A., Inc. IP Division

(57) ABSTRACT

The invention relates to the encoding and decoding of texture mapping data of a textured 3D object. A 3D object is usually represented by connectivity, geometry and property data. The texture data, belonging to the property data, include a texture image; a texture coordinates table having entries, each entry defining coordinates in the texture image; and texture indexes associating each vertex of a polygon in the 3D object with an entry in the texture coordinates table. The present invention proposes to search for and delete entry duplicates from the texture coordinates table. To reduce encoding complexity, the search and deletion are based on the connectivity data. This is to exploit redundancies between the mesh connectivity for the polygons within the 3D object and the texture connectivity for the texture polygons within the texture image.

13 Claims, 14 Drawing Sheets

(56) References Cited

OTHER PUBLICATIONS

Taubin, et al, "Geometry coding and VRML", Proceedings of the IEEE, vol. 86, Issue 6, Jun. 1998, pp. 1228-1243, See whole document particularly the section titled "B. Geometry and Property Encoding" starting on p. 1236.

Taubin, et al,"Geometric Compression Through Topological Surgery", ACM Transactions on Graphics, vol. 17, No. 2, Apr. 1998, pp. 84-115, See whole document particularly section 6 titled "Properties" starting on p. 104.

Zhou, et al, "An Entropy Coding Method for Floating-Point Texture Coordinates of 3D Mesh", IEEE International Symposium on Circuits and Systems 2010, May 2010, IEEE, pp. 1835-1838, See whole document particularly the section titled "B) Proposed Entropy Coding Method" starting on p. 1837.

\* cited by examiner

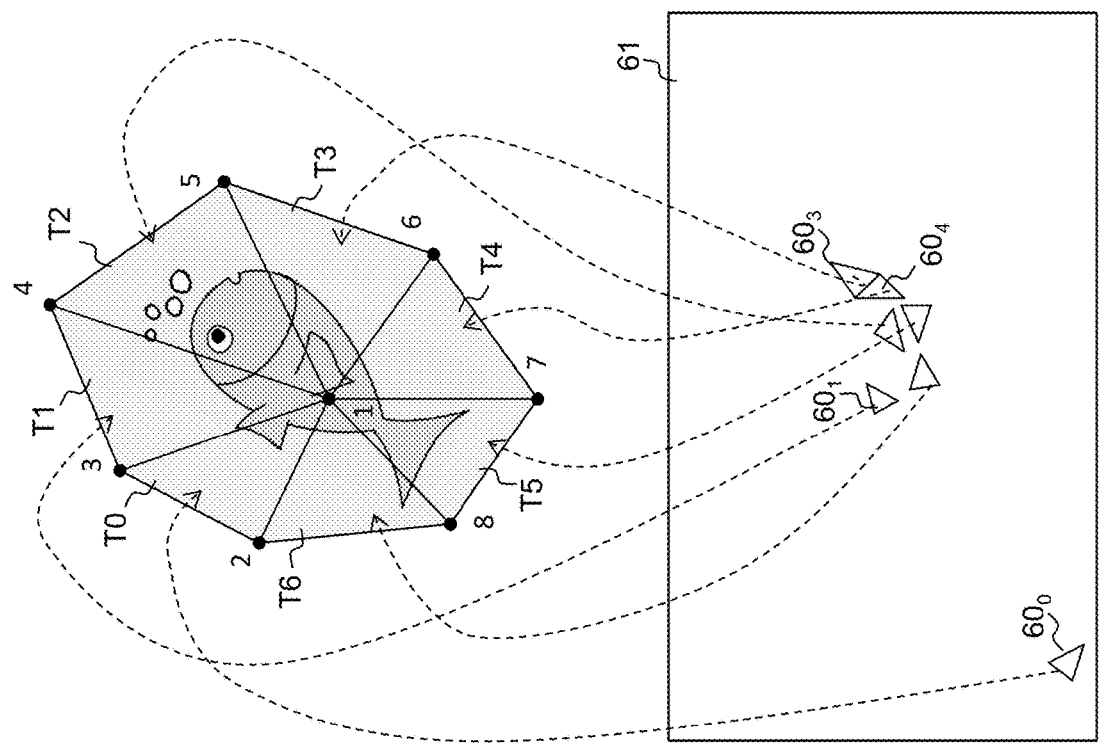

c.
| Decoded texture mapping data | | |
|---|---|---|
| Texture coordinates indexes 50 | Texture coordinates 51 | |
| | X | Y |
| 1 | 0.113748 | 0.030838 |
| 2 | 0.112322 | 0.027969 |
| 3 | 0.114139 | 0.029641 |
| 4 | 0.515838 | 0.604966 |
| 5 | 0.51388 | 0.603633 |
| 6 | 0.515591 | 0.602314 |
| 7 | 0.549983 | 0.588096 |
| 8 | 0.549992 | 0.591341 |
| 9 | 0.548309 | 0.589698 |
| ... | ... | ... |
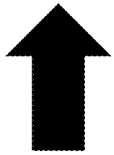
b.
| Order after Step 712 | |
|---|---|
| Texture coordinates 51 | |
| X | Y |
| 0.113748 | 0.030838 |
| 0.112322 | 0.027969 |
| 0.114139 | 0.029641 |
| 0.515838 | 0.604966 |
| 0.51388 | 0.603633 |
| 0.515591 | 0.602314 |
| 0.549983 | 0.588096 |
| 0.549992 | 0.591341 |
| 0.548309 | 0.589698 |
| ... | ... |
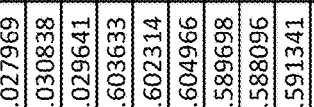
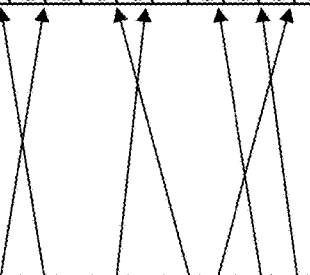
a.
| Texture mapping data before step 712 | | |
|---|---|---|
| Texture coordinates indexes 50 | Texture coordinates 51 | |
| | X | Y |
| 2 | 0.112322 | 0.027969 |
| 1 | 0.113748 | 0.030838 |
| 3 | 0.114139 | 0.029641 |
| 5 | 0.51388 | 0.603633 |
| 6 | 0.515591 | 0.602314 |
| 4 | 0.515838 | 0.604966 |
| 9 | 0.548309 | 0.589698 |
| 7 | 0.549983 | 0.588096 |
| 8 | 0.549992 | 0.591341 |
| ... | ... | ... |
Fig. 9

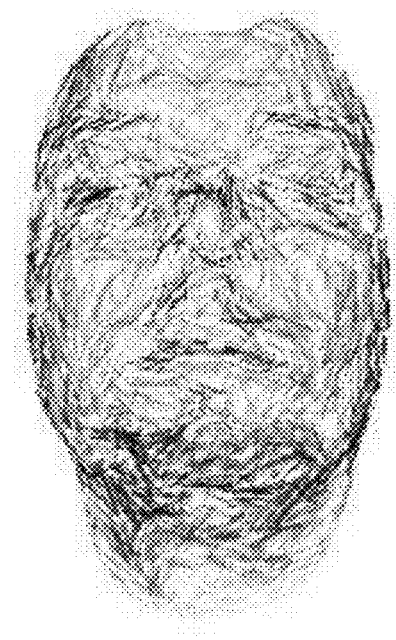
3D object
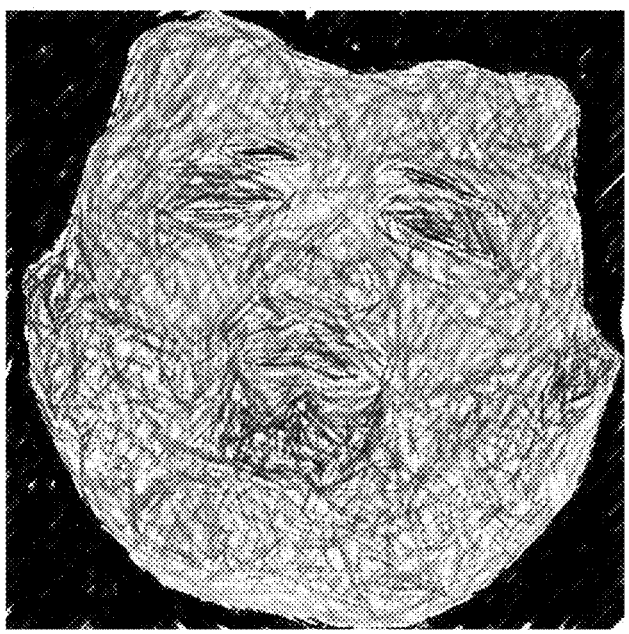
Texture image
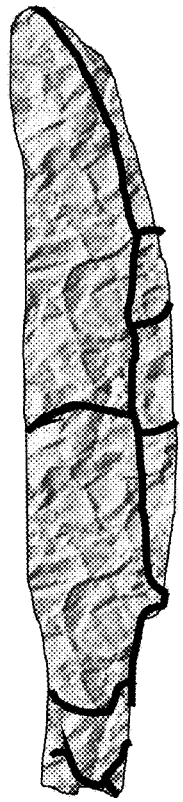
3D object
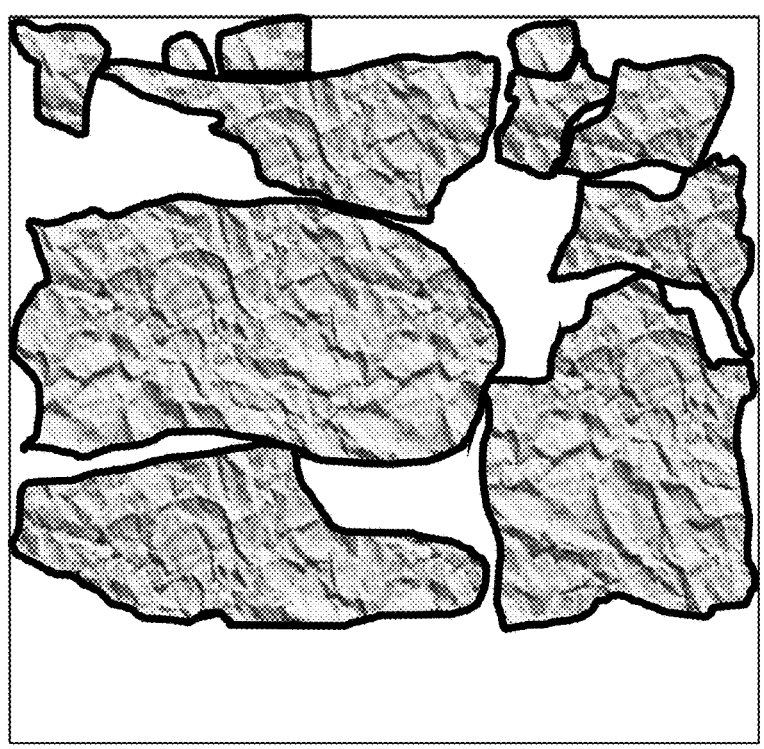
Texture image
Fig. 10

ENCODING AND DECODING OF TEXTURE MAPPING DATA IN TEXTURED 3D MESH MODELS

This application claims the benefit under 35 U.S.C. § 119(a)-(d) of United Kingdom Patent Application No. 1703556.9, filed on Mar. 6, 2017 and entitled "IMPROVED ENCODING AND DECODING OF TEXTURE MAPPING DATA IN TEXTURED 3D MESH MODELS". The above cited patent application is incorporated herein by reference in its entirety.

FIELD OF THE INVENTION

The present invention relates generally to the encoding of textured three-dimensional (3D) objects, and more specifically to methods and devices for encoding, into a bitstream, textured 3D mesh models made of a plurality of connected vertices forming for instance triangles.

BACKGROUND OF THE INVENTION 3D models may be made of a cloud of points. However, more common 3D models are 3D mesh models composed of polygons, e.g. triangles, between connected points, also denoted vertices.

Typically, 3D meshes are represented by three types of data: connectivity data, geometry data and property data. Connectivity data describe the adjacency relationship between the vertices composing the triangles, while geometry data specify vertex locations or positions, and property data specify attributes such as the normal vector, material reflectance and texture mapping.

Texture gives the 3D meshes or objects a more real appearance in the 3D rendering, by providing surface details (the "texture") to one or more elementary polygon composing the 3D meshes, thus also called textured 3D meshes.

Texture in a textured 3D mesh model is defined by so-called texture data, including a texture map and texture mapping data.

The texture map is usually an image applied (mapped) to the surface of the polygons. This may be a bitmap image or a procedural texture, including RGB color data, The texture mapping data define how the texture map should be applied (mapped) to the surface of the polygons. They include:

texture coordinates, usually grouped into a texture coordinates table, which indicates the vertices of the polygons within the texture map, and texture coordinates indexes which map each vertex of the polygons in the 3D mesh model to an entry of the texture coordinates table, thereby mapping each polygon in the 3D mesh model to a texture polygon in the texture map.

A 3D rendering engine builds a 3D objet and then maps parts of the texture map to each polygon forming the 3D object, using the texture data.

In well-known Scalable Complexity 3D Mesh Compression (SC3DMC) approach of the MPEG group, the texture coordinates indexes are reordered according to a connectivity order, i.e. the order in which the polygons (and thus their vertices) are successively traversed in the 3D mesh model using a connectivity-based traversal approach. The texture coordinates table is also reordered to follow the texture coordinates indexes order.

Experimentally, the inventors found best encoding results using the following configuration of the SC3DMC software: TFAN traversal for connectivity data coding and for texture coordinates indexes coding; so-called parallelogram predictor for geometry data coding; so-called circular coding method for the texture coordinates. Use of the circular method appears a quite bit surprising because, given the mere nature of the polygons (triangles in TFAN approach), it would have been expected that the parallelogram predictor be more efficient.

The texture mapping data (indexes and coordinates) amount to substantially 75% of the global bitrate made of connectivity, geometry and texture mapping data (i.e. the texture map being excluded). Improvements in the texture mapping data coding would be highly beneficial.

SUMMARY OF INVENTION

In embodiments, the present invention provides a method for encoding a textured three-dimensional mesh model into a bitstream, the textured 3D mesh model being composed of polygons between connected vertices, the method comprising the steps of obtaining texture data and of encoding the texture data in a bitstream, the texture data including:

a texture image, a texture coordinates table having entries, each entry defining a set of coordinates in the texture image, and texture coordinates indexes associating each vertex of a polygon in the textured 3D mesh model with an entry in the texture coordinates table (thereby defining, via the texture coordinates, the polygon-shaped portions of the texture image to be mapped onto the polygons in the 3D mesh model), wherein the method further comprises deleting entry duplicate or duplicates from the texture coordinates table before encoding the texture coordinates table.

Thanks to the deletion of the entry duplicates within the texture coordinates table, the amount of data to be encoded and transmitted can be drastically reduced.

Furthermore, texture connectivity (defined by the texture coordinates indexes) is better defined since the same index must be used where duplicates are identified. Their encoding is thus also improved.

Correspondingly, a device for encoding a textured three-dimensional mesh model into a bitstream, the textured 3D mesh model being composed of polygons between connected vertices, according to embodiments of the invention comprises at least one microprocessor configured for carrying out steps of obtaining texture data and of encoding the texture data in a bitstream, the texture data including:

a texture image, a texture coordinates table having entries, each entry defining a set of coordinates in the texture image, and texture coordinates indexes associating each vertex of a polygon in the textured 3D mesh model with an entry in the texture coordinates table, wherein the device is configured to delete entry duplicate or duplicates from the texture coordinates table before encoding the texture coordinates table.

Optional features of the embodiments of the invention are defined in the appended claims. Some of these features are explained here below with reference to a method, while they can be transposed into system features dedicated to the device of the invention.

In the field of 3D objects, connectivity data describing the connectivity between the vertices in the textured 3D mesh model are obtained.

Embodiments may provide that deleting entry duplicate or duplicates is based on the obtained connectivity data. This aims at reducing the encoding complexity, in particular because the search of entry duplicates can be limited within a very restricted number of entries (determined based on the connectivity data).

For instance, the restricted number of entries (or polygons to be considered) may be determined by successively considering each vertex of the textured 3D mesh model, and determining a plurality of polygons, preferably all the polygons, that share the vertex currently considered as a polygon vertex (i.e. polygons connected to the considered vertex) using the obtained connectivity data. Thus, one or more entry duplicates may thus be determined within only the set of entries associated, in the texture coordinates table, with the vertex currently considered in the determined polygons (i.e. only the entries corresponding to the vertex currently considered are retrieving and used for the determining).

In some embodiments, a texture flagging table may be built that has, for each vertex successively considered, one or more flags (preferably single bits) associated with one or more polygons of the corresponding determined plurality of polygons (preferably all and only the polygons different from the first polygon in said determined plurality of polygons given a connectivity order inferred from the obtained connectivity data), wherein the flag for a polygon is set to a first value when the entry associated with the shared vertex currently considered in the polygon is a duplicate of at least one reference entry, or another value otherwise.

The texture flagging table may be encoded and transmitted to the decoder, instead of the texture coordinates indexes. This saves additional bitrate.

In other embodiments in which deleting entry duplicate or duplicates includes: successively considering each vertex of the textured 3D mesh model, determining a plurality of polygons, preferably all the polygons, that share the vertex currently considered as a polygon vertex using the obtained connectivity data, and determining one or more entry duplicates within only the set of entries associated, in the texture coordinates table, with the vertex currently considered in the determined polygons, determining entry duplicates from amongst the set of entries may include comparing the entries of the set of entries to at least one reference entry.

In yet other embodiments in which a reference entry is used to identify duplicates and where the reference entry is initially set to the entry associated the vertex currently considered in the first, according to a connectivity order inferred from connectivity data of the textured 3D mesh model, polygon considered from amongst the determined polygons, the reference entry may be updated each time a new entry of the set of entries is different from the reference entry, by substituting the reference entry with the new entry.

In a variant, the reference entry is kept unchanged when comparing all the entries of the set of entries to the reference entry.

In another variant, the entries of the set of entries are compared to each reference entry of a set of reference entries, the set of reference entries being supplemented by each new and compared entry of the set of entries that is different from the reference entry or entries.

The present invention also provides a method for decoding a bitstream into a textured three-dimensional mesh model composed of polygons between connected vertices, and corresponding decoding device having at least one microprocessor configured for carrying out the steps of the method. The method comprises the following steps:

obtaining, from the bitstream, connectivity data describing the connectivity between the vertices in the textured 3D mesh model, obtaining, based on the bitstream, texture data including:
a texture image,
a texture coordinates table having entries, each entry defining a set of coordinates in the texture image, and
texture coordinates indexes associating each vertex of a polygon in the textured 3D mesh model with an entry in the texture coordinates table; and rendering the textured 3D mesh model using the obtained connectivity and texture data, wherein obtaining, from the bitstream, texture coordinates indexes includes:
decoding a texture flagging table from the bitstream,
successively considering each vertex of the textured 3D mesh model according to a connectivity order inferred from the obtained connectivity data to build a texture coordinates indexes table, wherein for each vertex currently considered, the polygons that shares the vertex currently considered as a polygon vertex are determined, and one or more flags associated with one or more polygons of the determined polygons are read from the decoded texture flagging table, and an index associated with the vertex currently considered in each of the one or more polygons is set in the texture coordinates indexes table based on the respective read flag.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the methods and devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIG. 5 illustrates exemplary texture mapping data;

FIG. 6 illustrates how texture polygons are retrieved from an texture image to map on each polygon defined in FIG. 5;

FIG. 9 gives an illustrative example of the reordering according to FIG. 8;

FIG. 10 shows two examples of texture images with corresponding textured 3D object;

DETAILED DESCRIPTION

The invention will now be described by means of specific non-limiting exemplary embodiments and by reference to the figures.

The present invention relates generally to the encoding of textured three-dimensional (3D) objects into a bitstream, usually textured 3D mesh models made of a plurality of points, for instance connected vertices forming triangles. The present invention particularly seeks to provide improvements to the coding of the texture data that define the mapping of texture portions onto the polygons forming the 3D mesh model.

Figure 1:
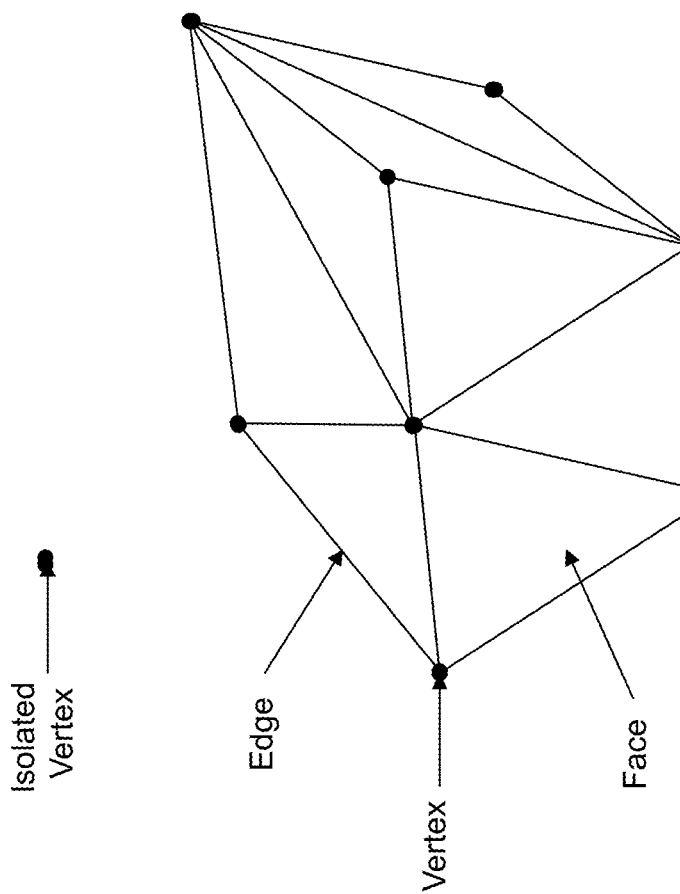
FIG. 1 illustrates a 3D mesh model is a representation of a tri-dimensional object or scene.

A 3D mesh model is a representation of a tri-dimensional object or scene. As shown in FIG. 1, it comprises vertices, edges connecting vertices and faces defined by edges. Isolated vertices, one of which is shown in the Figure, does not belong to any edge or face. Two isolated vertices may be connected one to the other without belonging to a face.

Although various face geometries can be used, for instance polygons such as quadrilaterals, a substantial part of the 3D mesh models is based on triangle-shaped faces. The present description focuses on the encoding of triangle-faced 3D mesh models for ease of illustration.

The relationship between the various vertices as represented by the faces or edges is called connectivity, while the positions of the vertices form what is called geometry. Connectivity data and geometry data are the main data to describe a 3D mesh model, and may be supplemented with other property data including a texture per face (other property data may include a normal per vertex or per face, a color per vertex and/or per face, etc.).

The connectivity data are usually provided as a list of polygons/triangles, each polygon/triangle being defined with identifiers/indexes of its vertices. The connectivity data are thus a list of indexes, each n-uplet defining an n-gon (polygon with n edges). The geometry data are usually provided as a list of vertex positions, that correspond respectively to the vertices listed in the connectivity order (in the same order), meaning that the i-th vertex position defines the position of the i-th vertex in the connectivity data.

Texture gives the 3D meshes or objects a more real appearance in the 3D rendering, by providing surface details (the "texture") to one or more elementary polygon composing the 3D meshes, thus also called textured 3D meshes.

Texture in a textured 3D mesh model is defined by so-called texture data, including a texture map and texture mapping data.

The texture map is usually an image applied (mapped) to the surface of the polygons. This may be a bitmap image or a procedural texture, including RGB color data, The texture mapping data define how the texture map should be applied (mapped) to the surface of the polygons. The present invention regards an improved encoding or decoding of the texture mapping data, which conventionally include:

texture coordinates, usually grouped into a texture coordinates table, which indicates the vertices of the polygons within the texture map, and texture coordinates indexes which map each vertex of the polygons in the 3D mesh model to an entry of the texture coordinates table, thereby mapping each polygon in the 3D mesh model to a texture polygon in the texture map.

At the decoder end, a 3D rendering engine builds a 3D objet and then maps parts of the texture map to each polygon forming the 3D object, using the texture data.

Most 3D compression algorithms compress connectivity data and geometry data separately. The coding order of geometry data is determined by the underlying connectivity coding. 3D mesh property data are usually compressed by a method similar to geometry compression. This is the case of the texture coordinates indexes and the texture coordinates that are conventionally compressed as the connectivity data (for the texture coordinates indexes) and the geometry data (for the texture coordinates). This is explained below with reference to FIG. 7.

Indeed, one can easily understand that similarly to the 3D mesh model in which the relative arrangement of the polygons defines connectivity, the relative arrangement of the texture polygons (defined by the texture coordinates and texture coordinates indexes) in the texture image also defines connectivity. Below, "mesh connectivity" defines the connectivity between the polygons within the 3D mesh model, while "texture connectivity" defines the connectivity between the texture polygons within the texture image.

Figure 2:
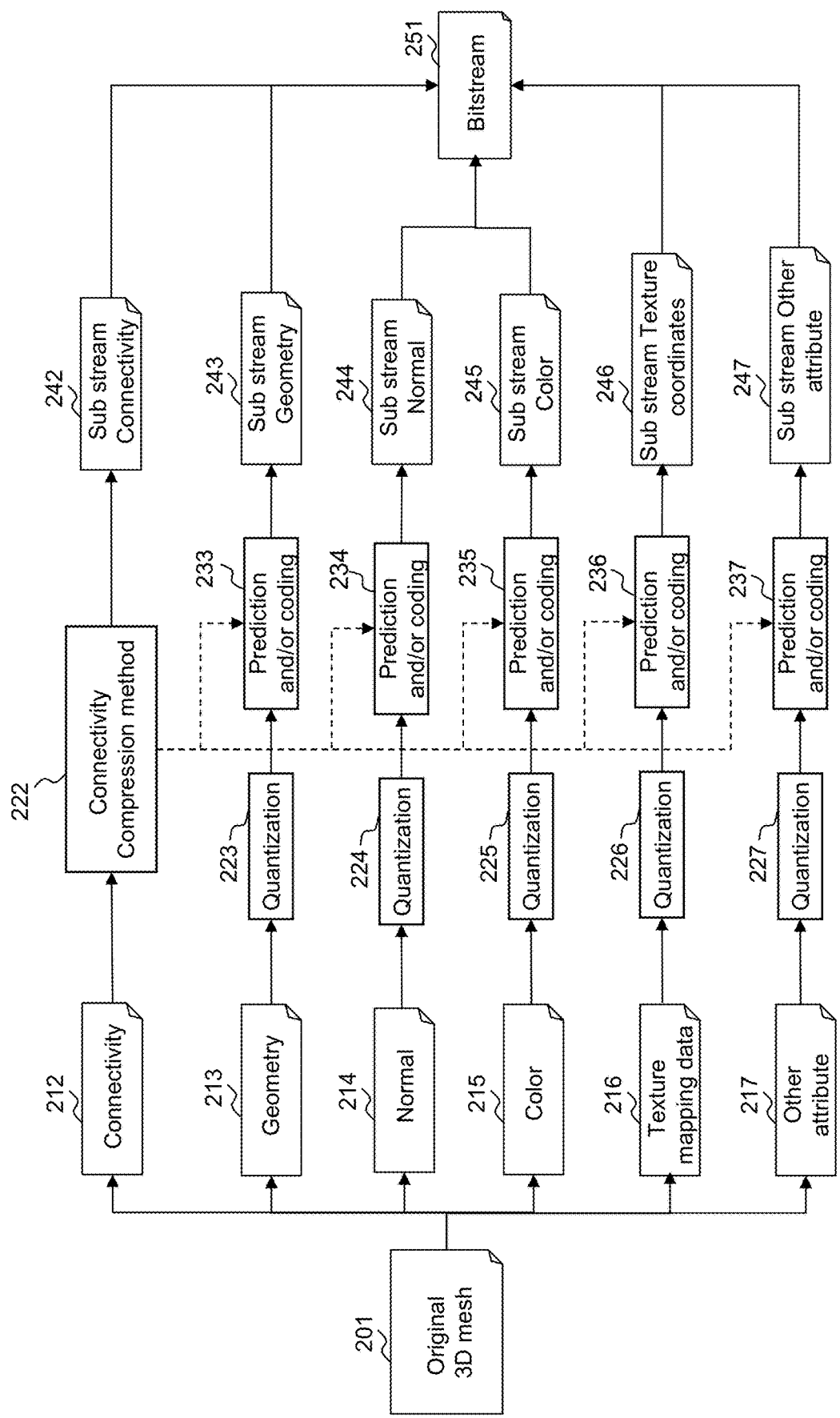
FIG. 2 illustrates general steps of a 3D mesh encoding process, in particular in the context of Scalable Complexity 3D Mesh Compression (SC3DMC)

FIG. 2 illustrates general steps of a 3D mesh encoding process, in particular in the context of Scalable Complexity 3D Mesh Compression (SC3DMC).

Connectivity data (defining the mesh connectivity), geometry data and property data are coded separately. Each of them 212 to 217 is extracted from the original textured 3D mesh model 201.

These data, except the connectivity data, can be quantized 223 to 227. The quantization is based on the number of bits needed to represent the data. The quantized geometry and property data are predicted and/or encoded directly, e.g. with respective entropy encoders, which may be arithmetic encoders 233 to 237.

Also the encoder compresses, i.e. encodes, the connectivity data at block 222. One known compression algorithm to encode the connectivity data is the Scalable Complexity 3D Mesh Compression-Triangle-Fan (SC3DMC-TFAN) approach of the MPEG Group, for instance as described in publication "*A Triangle-FAN-based approach for low complexity 3D mesh compression*" (Mamou K., Zaharia T., Preteux F., IEEE International Conference on Image Processing, 2009).

SC3DMC-TFAN includes traversing successively each vertex constituting the 3D mesh model; and for each vertex successively traversed, performing a triangle-based fan (T-FAN) analysis centered on the traversed vertex (i.e. one vertex of the triangles considered in the fan is the traversed vertex) to discover any new triangle not yet discovered when traversing the previous vertices, and determining (TFAN) connectivity data between vertices based on the newly discovered triangle or triangles. The T-FAN analysis makes it possible to obtain triangle-based fan portions, each made of a contiguous series of newly discovered triangle or triangles, i.e. of outer vertices that define a series of adjacent triangles having the traversed vertex in common. A fan portion may be up to an entire fan, if it is closed.

The fan portions and other data are encoded as connectivity data.

Alternative approaches to the triangle-based fan (TFAN) approach also exist.

The current standard offers a plurality of coding methods and prediction methods for the quantized geometry and property data.

With respect to the geometry data, a widely-used method is the so-called "connectivity-based geometry prediction", which provides efficient prediction. The main idea of this method is to use the connectivity between vertices (i.e. the connectivity data) to generate a geometry predictor. One known method of the connectivity-based geometry prediction is the parallelogram predictor described for instance in publication "*Triangle mesh compression*" (Touma C. and Gotsman C., Proceedings of the 1998 Graphics Interface Conference, p. 26-34, 1998).

Improved parallelogram-based predictors have been developed, for instance through combinations of two or more parallelogram predictors. This is discussed in the following publications: "*Rate-distortion optimized compression and view-dependent transmission of 3-D normal meshes*" (Sim J.-Y. et al., 2005, IEEE Transactions on Circuits and Systems for Video Technology 15, 7, 854-868), "*Geometry prediction for high degree polygons*" (Isenburg M. et al., In Proceedings of the Spring Conference on Computer Graphics, 147-152), "*FreeLence coding with free valences*" (Kälberer F. et al., 2005. Computer Graphics Forum 24, 3, 469-478) and "*Multi-Way Geometry Encoding*" (Cohen-Or D. et al., 2002, Technical report, School of Computer Science, Tel-Aviv University).

Similar approaches may be used for all or part of the property data.

The use of the mesh connectivity between the vertices to encode the geometry and/or property data is shown in the Figure by the hash arrow. While the Figure shows a hash arrow from block 222 (i.e. from connectivity data being encoded), the hash arrow may come from the connectivity data 212.

Next to the encoding, all the obtained sub-streams 242 to 247 (each representing one of the connectivity/geometry/property data) are combined together to form the output bitstream 251, for instance through a mere concatenation of sub-streams.

Figure 3:
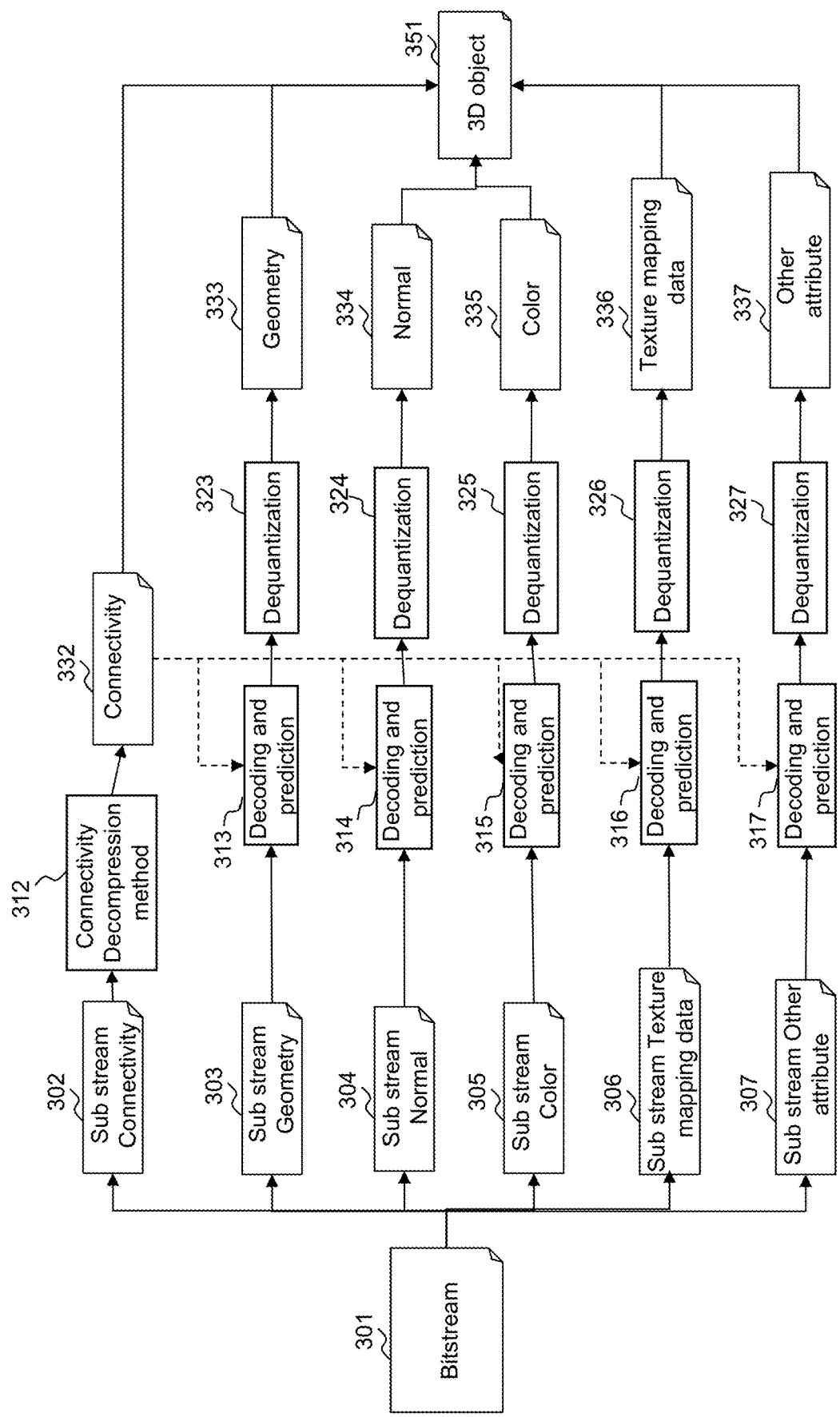
FIG. 3 illustrates general steps of the corresponding bitstream decoding process, into a 3D mesh model, in the context of SC3DMC.

FIG. 3 illustrates general steps of the corresponding bitstream decoding process, into a textured 3D mesh model, in the context of SC3DMC. The Figure is self-explicit since it produces the inverse process as the one of FIG. 2.

For instance, the bitstream 301 is extracted and split into subparts 302 to 307 corresponding to each coded data from the connectivity, geometry and property data. Each of them is entropy decoded and decompressed or inverse predicted (blocks 312 to 317). As mentioned for the encoding process, the prediction can be based on the decoded connectivity data 332.

Next, the decoded geometry and property data are dequantized at blocks 323 to 327 and inserted in the 3D object file 351 together with the connectivity data 332.

Obtained 3D object file 351 is the same as original textured 3D mesh model 201 except for the losses due to the quantization/dequantization processes.

The present invention focuses on the encoding and/or decoding of the texture mapping data 216/306.

As the texture coordinates and texture coordinates indexes are encoded similarly to the connectivity data and geometry data respectively in the SC3DMC algorithm, a short presentation of such encoding is provided below.

The encoding of connectivity data includes generating mesh connectivity data from the data of the original textured 3D mesh model 201 and then encoding each set of connectivity data thus generated.

As mentioned above, each vertex constituting the textured 3D mesh model is successively traversed to performing a TFAN analysis centered on the currently-traversed vertex to discover new triangles. The newly discovered triangles form one or more fan portions, each made of a contiguous series of new triangle or triangles. The connectivity data seek to describe these triangle-based fan portions, in order to be encoded and transmitted in the bitstream to the decoder, for the latter to be able to reconstruct the mesh connectivity between the vertices of the 3D mesh.

Usually, four main connectivity variables forming the connectivity data are handled.

A first connectivity variable is the number, also known as "Nfans", of triangle-based fan portions or any parameter representing such number, newly identified when processing the current vertex. Variable Nfans is transmitted once for each vertex successively traversed.

If Nfans equals 0, it means that all triangles connected to the current vertex have already been discovered and thus encoded in the connectivity data relating to previous vertices traversed, or that the current vertex is an isolated vertex. In that case, no more connectivity data is transmitted for the current vertex.

Otherwise, the other connectivity variables are provided for each of the identified fan portions. These variables describe each fan portion.

A second connectivity variable, also known as "degree of fan", is based on the number (or any parameter representing such a number) of vertices additional to the vertex currently traversed that form the fan portion, each of the triangles forming the fan portion. It may be computed from the number of triangles composing the fan portion considered. Usually, it is this number of triangles plus one when the fan portion is opened, and it is this number only when the fan portion is closed (i.e. it is a whole fan).

Third and fourth connectivity variables are used as identification data to identify a series of vertices forming the triangle-based fan portion. The third connectivity variable is made of a bitmap, also known as "OPS". The fourth connectivity variable is a list of one or more vertex indices that is associated with the bitmap. The vertex identifiers are usually indexes taken from one or more list of vertices generated when successively traversing the vertices defined in original data 201. In use, each bit of the bitmap indicates whether a corresponding vertex in the identified series has yet been identified when traversing the previous vertices, or not. The associated list of vertex indices identifies the vertices forming the fan portion that have already been identified when traversing the previous vertices.

The traversal of the vertices forming the 3D mesh model is based on a vertex discovery order, meaning that (except for the very first vertex) the next vertex to consider (or traverse) is the oldest discovered vertex. This traversal has an impact, since it modifies the initial order of the vertices as defined in data 201 into a new connectivity order (order in which the vertices are successively considered/traversed).

Preferably, the geometry data, which define the positions of vertices, are also reordered given the new connectivity order, in order to keep the original matching between the reordered vertices and their geometry data.

As far as the geometry data are concerned, it may be noted that they usually form a bigger portion than the connectivity data, in the bitstream. Efficient prediction and coding thereof is thus sought.

The basic information of the geometry data in a raw file is positions of points, including vertices forming the above-mentioned triangles, preferably reordered to match the connectivity order. Some points may be isolated, meaning they are not vertices of a triangle.

As mentioned above, the first step for the compression or encoding of the geometry data 213 is a quantization step 222. This step quantizes all coordinates (usually three position components: abscissa, ordinate and applicate) of the vertex positions.

This step is necessary because, in input files or in the memory of computers, the vertex coordinates are often represented by three IEEE 32-bit floating-point numbers. However, the 32-bit precision provided by such a representation is not required in most of the applications.

Quantization can thus significantly reduce the amount of geometry data (in terms of bits) to encode, without limited quality losses (usually not perceptible by a human being).

Conventional scalar quantization consists in transforming the floating-point number positions into integer positions. A mesh bounding box encompassing the 3D mesh, usually the smallest box (e.g. a rectangular cuboid) including the 3D mesh, is first determined, and then partitioned into a 3D grid. The number of cells per axis depends on the maximum integer that can be coded with the number of quantization bits. The size of each cell can either be uniform or non-uniform.

Each vertex of the mesh is approximated with a reference position of the cell to which it belongs, e.g. of the cell center. The integer position is then composed of the three index coordinates of the cell reference position.

Most of the geometry encoders use a uniform scalar quantization. The number of quantization bits usually ranges from 8 to 16. Of course higher numbers may be considered for higher precision. The mesh geometry is consequently slightly altered contrary to the mesh connectivity.

In SC3DMC, the quantization of vertex position is based on the range of each component (X, Y, Z) as described in the following pseudo code:
for i={X, Y, Z}

$$V'[i]=(V[i]-\text{Min}[i])*(1<<\text{nQBits}-1)/(\text{Max}[i]-\text{Min}[i])+0.5f$$

where V[i] the original component 'i' of vertex position V, V'[i] is the quantized component 'i', and Min[i] and Max[i] are respectively the minimum and the maximum values of all V[i] (i.e. define the range of the mesh bounding box along the i-axis). Operator X<<Y means a left shift of the number X by the number of digit Y in base 2. It corresponds to Y integer divisions by 2 (i.e. division by $2^Y$).

This quantization means that the value range Max[i]-Min[i] for each coordinate is represented according to a certain number of bits given by the quantization parameter nQBits. But with this quantization, the components of a vertex do not have the same precision given the different value ranges for the position components within the mesh.

To obtain the same precision for all components of each vertex, the quantization must use the same divisor (Max[i]-Min[i]) for each component. In a proposed implementation, the quantization of SC3DMC is changed to take into account the biggest range of the mesh bounding box defined as follows: MaxRange=MAX(Max[X]-Min[X], Max[Y]-Min[Y], Max[Z]-Min[Z]).

Thus,
for i={X, Y, Z}

$$V'[i]=(V[i]-\text{Min}[i])*(1<<\text{nQBits}-1)/(\text{MaxRange})+0.5f$$

Next to the quantization, the position of a current vertex to encode is predicted using the geometry data (i.e. position) of the already-encoded neighbors, i.e. the other vertices connected to the current vertex that have already been encoded.

If the prediction is accurate, the prediction error is small, so it can later be efficiently entropy coded.

Various approaches have been proposed in the prior art.

A first approach uses differential prediction according to which the position of the current vertex is predicted by the position of the immediately previous vertex. The difference between these 2 values, also known as residue, representing the vector between the two positions, is then encoded. This differential method, described in "*Geometry compression*" (Deering M., 1995, In Proceedings of the 22nd Annual Conference on Computer Graphics and Interactive Techniques, pp. 13-20) is available in the SC3DMC standard, in addition to a conventional no prediction method.

An improvement of the differential prediction is described in "*Single resolution compression of arbitrary triangular meshes with properties*" (Bajaj C. et al., 1999, Computational Geometry 14, 1-3, pp. 167-186) which provides a second-order predictor that encodes the differences between consecutive residual predictions.

A second approach is the topological surgery algorithm described in "*Geometric compression through topological surgery*" (Taubin G. et al., 1998, ACM Transactions on Graphics 17, 2, pp. 84-115). This approach uses linear prediction: the position of the current vertex is predicted by a linear combination of the K immediately preceding vertices in the vertex spanning tree. The K parameters of the linear function minimize the mean square prediction error over the mesh. Their values are stored in the compressed file to be available to the decoder.

A third approach is the adaptive geometry prediction method of the SC3DMC standard. In this approach, each component of the current vertex is predicted by one from among the seven last encoded vertices or is not predicted. The best prediction, in terms of coding cost, from among these eight possible predictions is transmitted.

A fourth approach for geometry prediction is the above-mentioned connectivity based geometry prediction, which uses the mesh connectivity between vertices (connectivity data 212) to define predictors for the geometry data.

Figure 4:
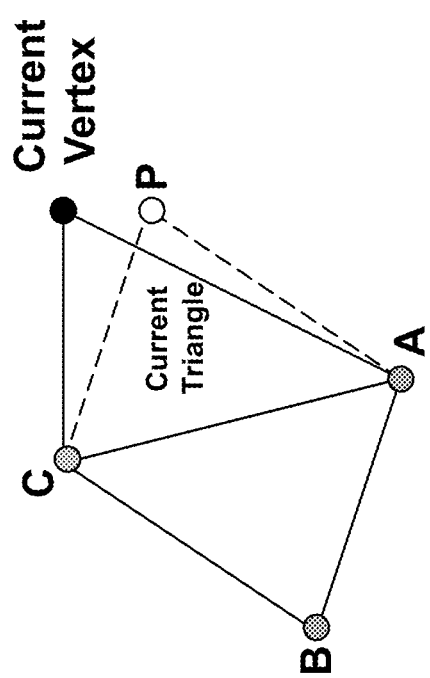
FIG. 4 illustrates a parallelogram-based predictor according to the prior art.

Besides valence-driven connectivity encoding, "Triangle mesh compression" (Touma C. and Gotsman C., Proceedings of the 1998 Graphics Interface Conference, p. 26-34, 1998) introduced parallelogram prediction. In the case of FIG. 4, a predictor is searched for the next vertex connected to vertices A and C (i.e. forming a triangle with them). A piece of knowledge is triangle ABC.

The parallelogram-based prediction introduces a new vertex P as shown in FIG. 4 to form a triangle from the edge AC, such that the ABCP form a parallelogram. Vertex P is thus used as a predictor for the current vertex to encode.

Experimental results show that triangle mesh geometry can be compressed at about 8.5 bpv with an 8-bit quantization, using the parallelogram-based prediction.

Turning now to the texture mapping data, the texture coordinates indexes are usually provided as a list of indexes which point to the entries of the texture coordinates table. The indexes are listed in the same order as the vertices in the original connectivity data (before TFAN analysis), meaning that the i-th index in the list gives the entries in the texture coordinates table for the i-th vertex in the original connectivity list of indexes.

The texture coordinates are usually provided as a list of vertex positions in the texture map (or image). Each vertex of each triangle of the 3D mesh model is thus associated with a vertex position in the texture map, thanks to the list of texture coordinates indexes. As a consequence, it is possible to retrieve a corresponding triangle in the texture map and to map it onto the triangle considered in the 3D mesh model, to render the texture of all the faces of the 3D mesh model.

This texture map is an image file generally coded with JPEG, in the bitstream 251. However, other formats such as PNG may be contemplated. No more details are provided regarding the texture map, since the present invention focuses on the encoding of the texture mapping data (information to map face to the texture image).

FIG. 5 illustrates exemplary texture mapping data. For ease of explanation, the texture mapping data are supplemented with the original connectivity list of indexes (first column).

In this example, the connectivity data is the list of vertex indexes: 1,2,3,1,3,4,1,4,5,1,5,6, and so on, defining seven triangles (first triangle is 1,2,3; second triangle is 1,3,4; so on).

The texture coordinates indexes 50 (second column) follow the same order as the connectivity data and gives a texture coordinates entry for each corresponding vertex of a triangle. For instance, vertex with index=6 (first column) in the fifth triangle of the Figure is given the texture coordinates entry with index=14.

The texture coordinates 51 (third and fourth columns) gives the position of the vertex for the corresponding texture, in the texture map. FIG. 6 illustrates how the texture triangles 60, are retrieved from the texture image 61 to map on each triangle defined in FIG. 5.

In the WRL file (or PLY file), the texture coordinates are a list of three couples (X, Y), thereby defining all the vertex positions in the texture map, for a given triangle of the 3D mesh model. X and Y are floating values between 0 and 1 as shown in the Figure.

In SC3DMC, the texture coordinates indexes do not need to be quantized (similarly to the connectivity data), while the texture coordinates are, of course, quantized because such data are represented by floats in the input RAW file. A quantization formula of the SC3DMC standard is:

intCoord[$i$][$j$]=(int)(floatCoord[$i$][$j$])

where intCoord[i][j] contains the component 'j' (j=X or Y) of the quantized texture coordinates 'i' which will be encoded; (int)(x) gives the integer part of x; floatCoord[i][j] contains the component 'j' of the texture coordinates 'i' represented in floating points extracted from the input RAW file.

In one embodiment of the present invention, the quantization formula of the texture coordinates is modified as follows:

intCoord[$i$][$j$]=(int)(floatCoord[$i$][$j$]+0.5)

The addition of 0.5 in the formula provides a better rounding, while the texture information does not seem shifted compared to the original object as obtained with the SC3DMC formula (however the smaller the number of bits, the higher the shifting effect). Consequently, the modified formula makes it possible to increase the quantization of the texture coordinates, in order to reduce the bitrate for a visually lossless rendering.

In some embodiments, the quantization parameters for the texture coordinates may be determined based on the texture map/image resolution. For instance, the granularity may be set to one pixel, meaning that if the resolution of the texture image is 256*256 pixels, the number of bits to represent each component of the texture coordinates is equal to 8 (because 8 powers of 2 is equal to 256). More generally, if the resolution is Height×Width (in pixels), then the number of bits for component X of texture coordinates, nQbitsX, may be chosen as follows: $2^{nQbitsX-1}<\text{Width}\leq 2^{nQbitsX}$, and the number of bits for component Y of texture coordinates, nQbitsY, may be chosen as follows: $2^{nQbitsY-1}<\text{Height}\leq 2^{nQbasY}$.

The list of texture coordinates indexes 50 has the same nature (indexes) as the connectivity data: in fact the list defines triangles in the texture image 61, and may thus also be considered as connectivity information. Consequently, the list may be encoded using the same method as for the connectivity data. In SC3DMC, the texture coordinates indexes 50 are encoded using the TFAN analysis, thereby modifying the order of the indexes (and their values). However, the coding efficiency is low. The inventors have identified this low efficiency comes from the fact each triangle in the texture image 61 is defined independently in the texture mapping data (meaning a new texture coordinates index is given to each new vertex of a triangle in the 3D mesh model). Embodiments described below with reference to FIGS. 10 to 15 intend to improve coding efficiency of the texture coordinates indexes 50 by restoring texture connectivity within the texture coordinates indexes, in particular where two texture vertices defined independently in the texture mapping data 51 correspond in fact to the same vertex within the texture image 61.

Also, the list or table of texture coordinates 51 has the same nature (coordinates) as the geometry data. Consequently, the table may be encoded using the same method as for the geometry data. In SC3DMC, the texture coordinates 51 are encoded using one of the prediction methods available for geometry data coding: No Prediction, Differential, XOR, Adaptive, Circular and Fast Parallelogram.

Figure 7:
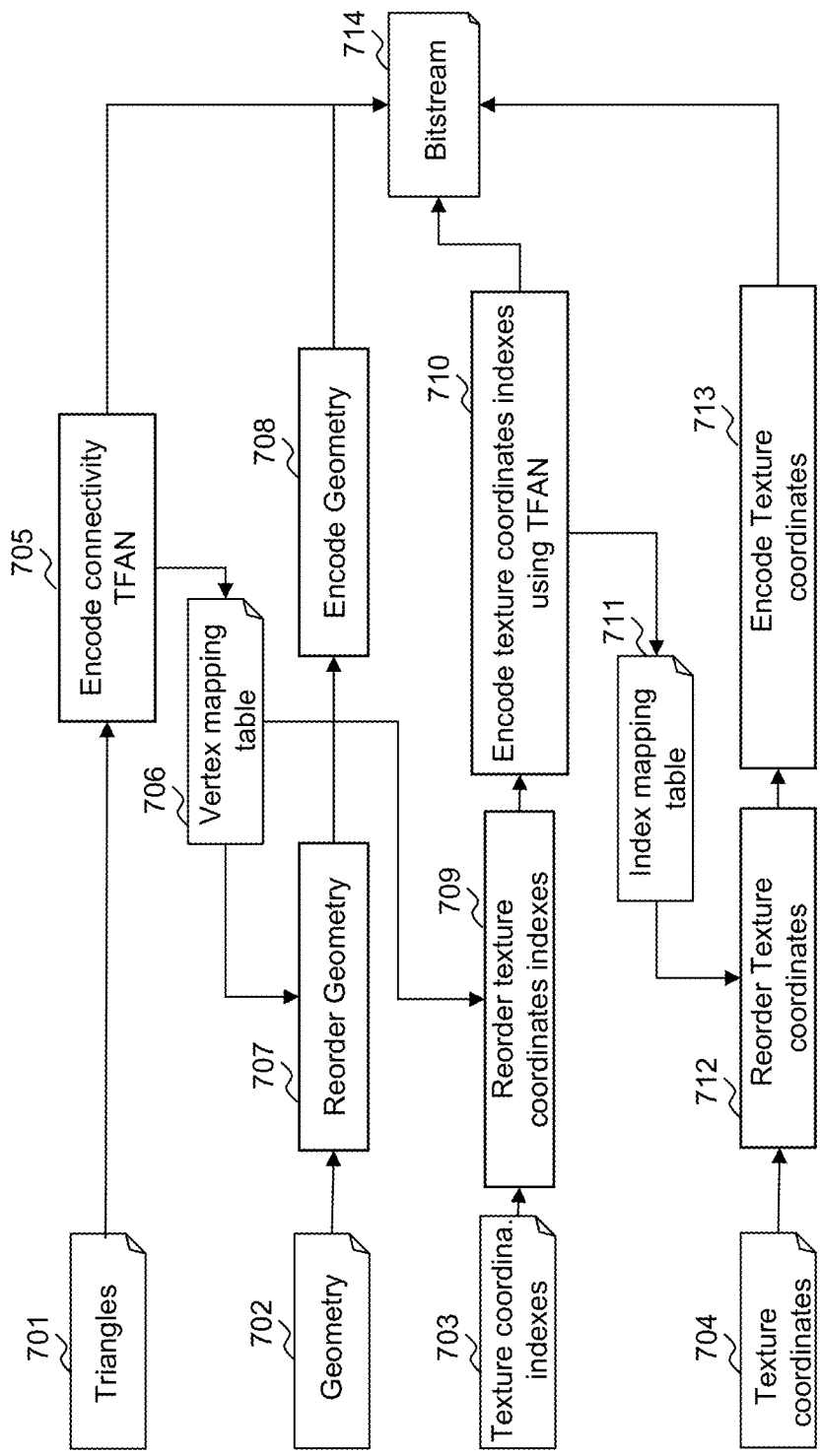
FIG. 7 illustrates, using a flowchart, the SC3DMC encoding of connectivity data, geometry data and texture mapping data.

FIG. 7 illustrates, using a flowchart, the SC3DMC encoding of connectivity data 212, geometry data 213 and texture mapping data 216. This figure is similar to FIG. 2 with more details and dedicated to the compression of a 3D mesh containing texture coordinates indexes 50 and texture coordinates 51.

As mentioned above, the TFAN-based encoding 705 of the connectivity data 701 usually modifies the order in which the vertices are originally defined in the RAW file. The vertex mapping table 706 stores this order modification, making it possible to reorder (707) the geometry data 702 before encoding (708). The vertex mapping table 706 defines, at rank n, the new vertex position of vertex n in the new connectivity order.

As the texture coordinates indexes 703 are initially defined for each vertex of the connectivity data, with a one-to-one matching following the same order, they are also reordered 709 based on the vertex mapping table 706. Next, the reordered list of texture coordinates indexes 703 is encoded using the TFAN method 710, which modifies again the order of the texture coordinates indexes. The index mapping table 711 stores this order modification, making it possible to reorder (712) the texture coordinates list 704 before encoding (713). This is because the TFAN-based encoding of the texture coordinates indexes only provides (for the decoder) a set of triangles with connectivity information. The reordering of the texture coordinates list 704 thus ensures the decoder can map each new vertex obtained when the decoding the texture connectivity (texture coordinates indexes) to the appropriate texture coordinates (corresponding to the next entry in the texture coordinates list 704).

All the encoded data are included in a bitstream 714 (with the encoded texture image and any other property data).

At decoder side there is no need of reordering because the decoding process does not change the order of vertices.

Experimentally, the inventors found best encoding results using the following configuration of the SC3DMC software: TFAN traversal for connectivity data coding and for texture coordinates indexes coding; so-called parallelogram predictor for geometry data coding; so-called circular coding method for the texture coordinates. Use of the circular method appears a quite bit surprising because, given the mere nature of the polygons (triangles in TFAN approach), it would have been expected that the parallelogram predictor be more efficient.

The texture mapping data (indexes and coordinates) amount to substantially 75% of the global bitrate made of connectivity, geometry and texture mapping data (i.e. the texture map being excluded). Improvements in the texture mapping data coding would be highly beneficial.

Various embodiments are proposed to provide a better texture mapping data coding.

First embodiments, described below with reference to FIGS. 8 and 9, propose to reorder the texture coordinates 51/704 according to the connectivity data (after TFAN-based encoding) when the texture coordinates indexes are no longer required. Bitrate may be saved since the texture coordinates indexes are no longer needed in the bitstream.

Second to fourth embodiments, described below with reference to FIGS. 10 to 15, propose to delete entry duplicate or duplicates from the texture coordinates table 51/704 before encoding. The amount of texture coordinates is thus reduced, saving bitrate. In addition, a single entry of texture coordinates can be used for two or more vertices in the texture coordinates indexes, thereby restoring texture connectivity between the texture coordinates indexes. Consequently, the TFAN-based encoding of such texture coordinates indexes is improved.

More precisely, third and fourth embodiments, described below with reference to FIGS. 13 to 15, propose to delete the entry duplicate or duplicates using the connectivity data 701. This aims at reducing the encoding complexity, in particular because the search of entry duplicates can be limited within a very restricted number of entries (determined based on the connectivity data).

In particular, the fourth embodiments, described below with reference to FIGS. 14 and 15, propose a specific coding of the texture coordinates indexes by exploiting redundancies between mesh connectivity and these indexes (i.e. texture connectivity).

Figure 8:
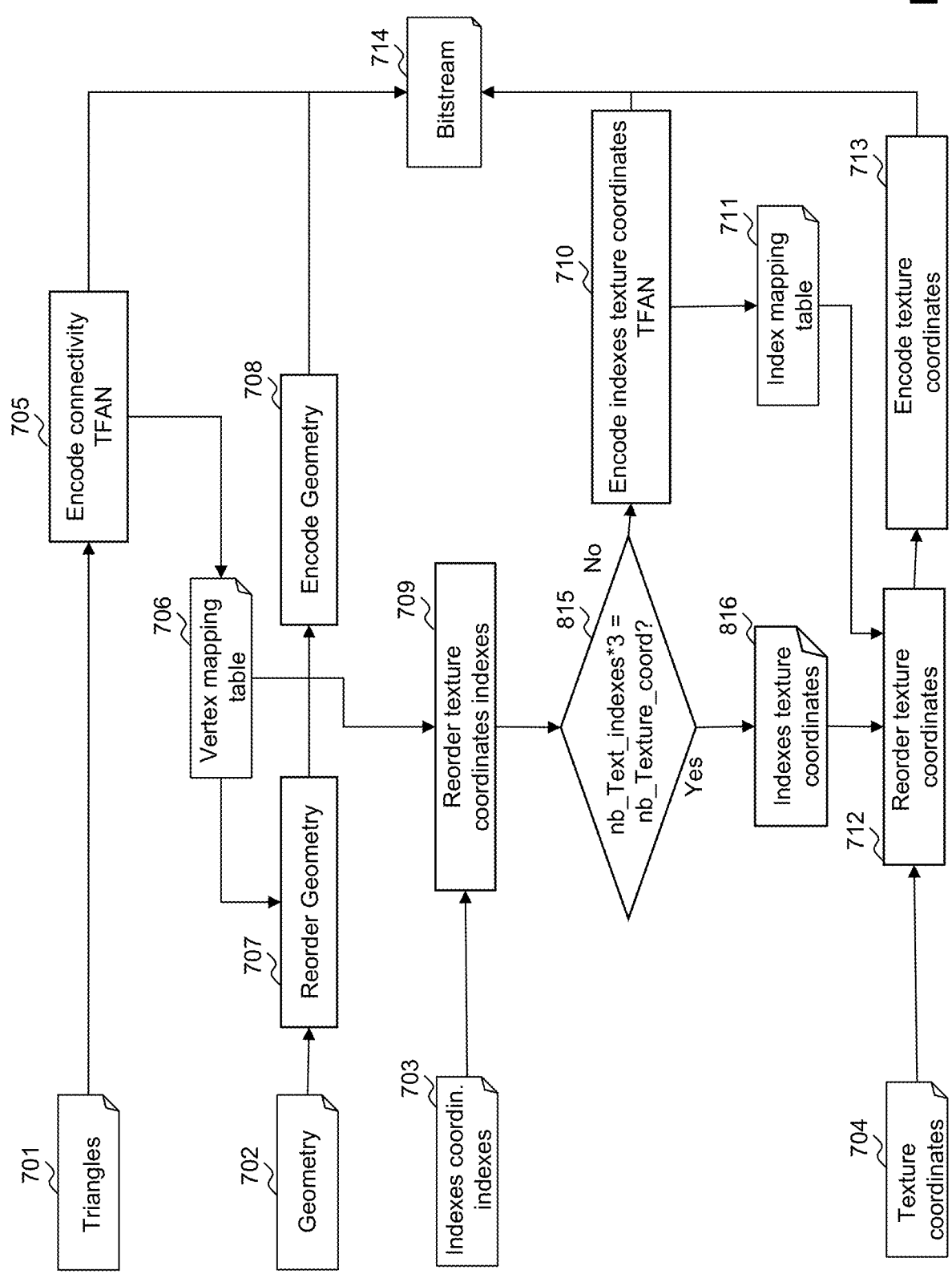
FIG. 8 illustrates, using a flowchart, first embodiments of the invention relying on a reordering of the texture coordinates in the case where there is no texture connectivity between the texture coordinates indexes.

With reference to FIGS. 8 and 9, the first embodiments relies on the fact the texture coordinates indexes are useless when there is no common texture coordinates indexes between the vertices of the triangles or when the texture connectivity given by the texture indexes exactly matches the mesh connectivity (i.e. the texture triangles have the same relative organization within the texture image as the corresponding triangles within the 3D mesh model, from a connectivity perspective).

In both cases, the listing (or order) of the vertices within the connectivity data (after TFAN encoding) can be used to organize the texture coordinates 51/704. Indeed, the decoder obtaining the same connectivity data is able to perform the appropriate matching between each vertex of a mesh triangle and the corresponding vertex of a texture triangle.

FIG. 8 illustrates, using a flowchart, such reordering of the texture coordinates, in the case where there is no texture connectivity between the texture coordinates indexes. This corresponds to the case where each triangle in the 3D mesh has a texture face and each vertex of each face has its own entry in the texture coordinates table 51/704.

In fact, in such situation, the table of texture coordinates indexes 50/703 only associates each vertex of a triangle in the 3D mesh model with one texture coordinates index. The same mapping can be made using the connectivity data that already identify each vertex of all the triangles (see first column in FIG. 5 listing all the vertices, even if the same identifier is repeated several times).

To discard the useless table of texture coordinates indexes 50/703, the process of FIG. 8 adds two blocks, 815 and 816, to the above process of FIG. 7. Thanks to these additional blocks, if the number of entries in the texture coordinates table equals n times the number of faces or n-gons (polygons with n edges) in the 3D mesh model (e.g. three times the number of triangles in a triangle-based 3D mesh model), the table of texture coordinates 51/704 is reordered to follow a connectivity order inferred from the obtained connectivity data (after TFAN analysis).

In particular, the texture coordinates indexes 50/703 may be first reordered following the connectivity order, as done in FIG. 7 (step 709), and the reordered indexes (instead of the index mapping table 711) may be used to reorder the texture coordinates 51/704.

In more details, step 815 determines whether the amount of texture coordinates (i.e. number of entries 51/704) is equal to three times (in case the polygons are triangles) the number of texture coordinates indexes 50/703, or not. Alternatively, it may determine whether each triangle in the 3D mesh has a texture face and each vertex of each face has its own entry in the texture coordinates table, or not.

When condition 815 is satisfied, the texture coordinates indexes 50/703 are not coded (absence of step 710), and these indexes (816) once reordered (709) based on the connectivity order are also used to reorder (712) the texture coordinates 51/704 instead of using the conventional index mapping table 711 of the SC3DMC algorithm. As a result, the texture coordinates 51/704 are ordered in the same order as the connectivity order; the table of texture coordinates indexes is no longer needed and may not be inserted in the bitstream and decoded.

When condition 815 is not satisfied, there is no change in the SC3DMC process, meaning the texture coordinates indexes 50/703 are encoded using TFAN approach 710 and the index mapping table 711 is used to reorder the texture coordinates 51/704.

FIG. 9 illustrates the reordering according to the first embodiments.

After step 709 (FIG. 9a), the texture coordinates indexes 816 contain the entry index of the texture coordinates 51 for each vertex of each triangle considered in the same order as the connectivity data (i.e. according to the TFAN-based traversal of the vertices within the 3D mesh model).

Step 712 of reordering based on the texture coordinates indexes 816 reorders the texture coordinates 51 (arrows between FIG. 9a and FIG. 9b) according to the order of the texture coordinates indexes 816. Consequently, the texture coordinates 51 are ordered in the same order as the vertices of the 3D mesh model, i.e. in the "natural" order (i.e. the TFAN-based connectivity order) as shown in FIG. 9c.

One directly understands that, by avoiding the encoding of the texture coordinates indexes in the bitstream, a gain of 100% is obtained for the encoding of such indexes compared to the SC3DMC standard. The encoder may explicitly signal, in the bitstream, that the texture coordinates indexes are not available. On its side, the decoder thus recreates the indexes by setting a table which contains for each entry its rank ("the natural order").

However, in some specific embodiments, the (reordered) textures coordinates indexes 816 may be inserted in the bitstream anyway. Preferably, these indexes 50 are not coded with the same connectivity coding method (TFAN-based) as the connectivity data 701, but with a differential or circular method. Indeed, in that case, the prediction is the same for all the indexes except for the first one. Consequently, the entropy is very low and the related number of bits is small, thereby allowing a gain close to 100%.

As far as the texture coordinates are concerned, a coding gain is also observed. This is because, on average, a triangle of the texture image as defined by the texture coordinates 51/704 should have more neighboring triangles defined by the neighboring texture coordinates, than in the prior art algorithm (because the TFAN-based coding losing the order is not implemented in the case of block 816). Thus, better prediction of the texture coordinates can be obtained.

In these illustrations of the first embodiments, step 815 checks whether there is or not connectivity between the texture coordinates indexes. As mentioned above, a variant may rely on whether (alternative for step 815) the texture connectivity between the texture coordinates indexes exactly matches the connectivity data (i.e. the texture triangles have the same relative organization within the texture image as the corresponding triangles within the 3D mesh model, from a connectivity perspective). This is for example the first example of FIG. 10 where all the texture triangles form one and single part in the texture map.

A simple way to compare the texture connectivity with the mesh connectivity is to compare the result of their TFAN-based encoding: they should be identical if started from the same vertex.

At the decoding side, the decoder is able to match each new vertex discovered when decoding the connectivity data with the next entry of the received texture coordinates (because both follow the same order).

Figure 11:
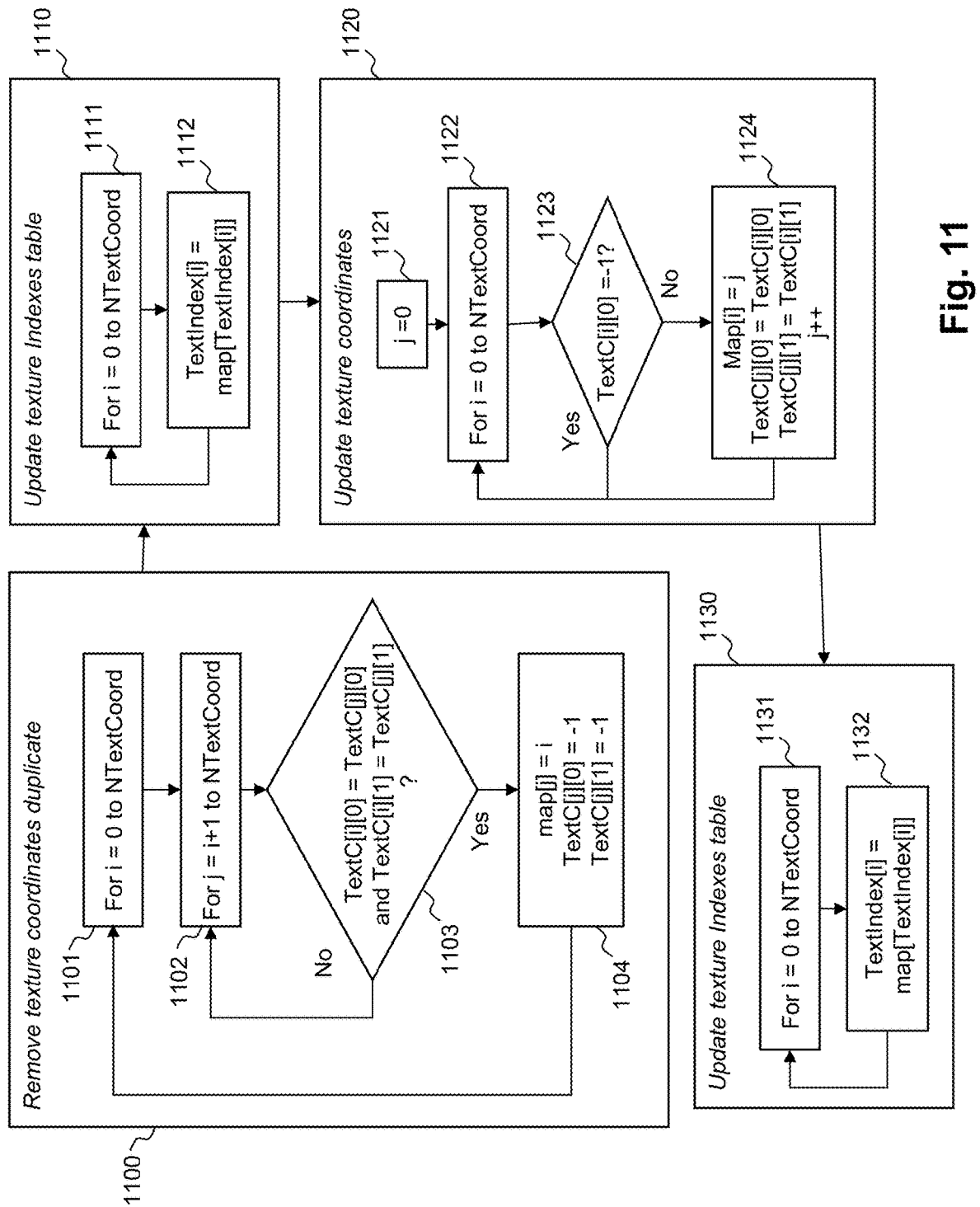
FIG. 11 illustrates, using a flowchart, second embodiments of the invention relying on entry duplicate deletion within a texture coordinates table.
Figure 12:
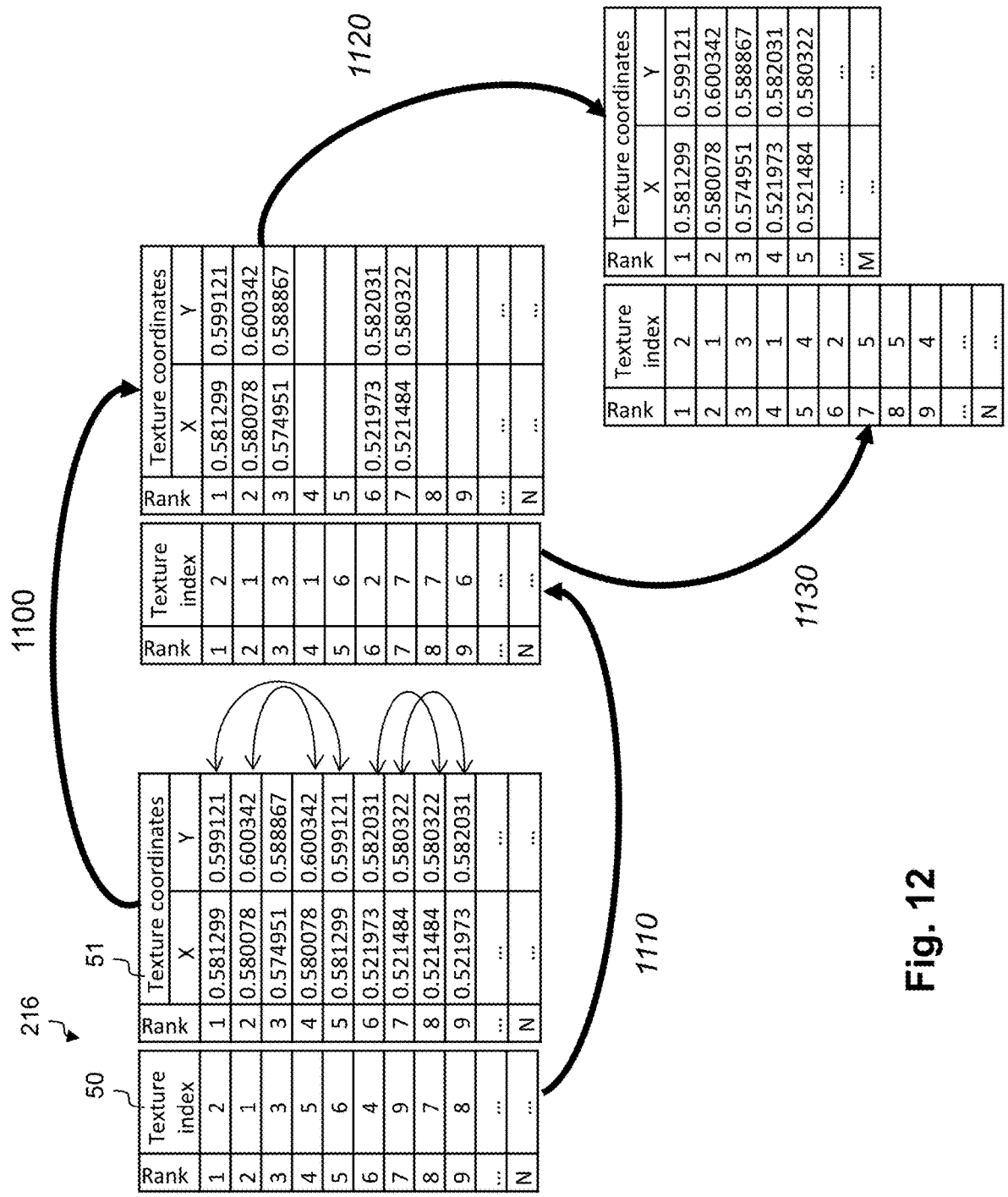
FIG. 12 illustrates the process of FIG. 11 on a specific example of texture mapping data.

With reference to FIGS. 10 to 12, the second embodiments (as well as the third and fourth embodiments below) assume there are a large number of redundancies (duplicates) within the texture coordinates 51.

FIG. 10 shows two examples of texture images 61 (right part) with corresponding textured 3D object (left part).

These texture images contain some flattened portions of the 3D mesh model: a single one for the first example, and a plurality of flattened portions for the second example. Each flattened portion corresponds to a multiplicity of elementary texture triangles mapped to the triangles of the 3D mesh model. It means that some neighboring triangles in the 3D domain have common vertices and edges with their neighboring triangles in the texture images 61.

However, as shown in FIG. 5 above, each vertex of each triangle in the 3D mesh model has its own couple of texture coordinates 51: there are as many texture coordinates entries as three times the number of triangles in the 3D mesh model. In this example of the Figure (also FIG. 6), the illustrative 3D mesh model is made of 8 vertices with 7 faces. Thus for each face, 3 couples of coordinates are defined, meaning 21 couple of texture coordinates are provides for the 21 vertices defining the triangles in the texture image 61.

In the second to fourth embodiments, it is thus sought to delete entry duplicate or duplicates from the texture coordinates table 51 before encoding the texture coordinates table. This is preferably to then substitute the texture coordinates index 50 associated with a deleted entry duplicate with the texture coordinates index associated with a kept entry that is identical to the deleted entry duplicate. In other words, a unique (texture coordinates) index 50 is set for the same position in the texture image 61. This modification of the SC3DMC approach reduces the amount of texture coordinates 51, saving bitrate, and also reduces the range of the texture coordinates indexes 50, thereby allowing an encoding over fewer bits. Lastly, the resulting texture coordinates indexes 50 include more texture connectivity, which allows a better TFAN-based encoding 710.

FIG. 11 illustrates, using a flow chart, exemplary second embodiments where a brute force approach for entry duplicate deletion is implemented.

Basically, four steps are provided, successively step 1100, step 1110, step 1120 and step 1130. Step 1100 deletes or removes entry duplicate or duplicates from the texture coordinates table 51 before encoding the texture coordinates table. Step 1110 substitutes the texture coordinates index 51 associated with a deleted entry duplicate with the texture coordinates index associated with a kept entry that is identical to the deleted entry duplicate. Step 1120 is performed once the entry duplicates have been deleted from the texture coordinates table 51, and assigns successive entry indexes to the remaining entries in the texture coordinates table. Step 1130 updates the texture coordinates indexes 51 to mirror the changes in the entry indexes of the remaining entries in the texture coordinates table.

To perform these steps, variable 'map' is used that is an array for storing the mapping between the 'old' texture coordinates indexes before entry duplicate deletion and the texture coordinates indexes to be used in replacement (because it points to the same values of texture coordinates). This variable is initialized as follows: map[i]=i because it is first assumed there is no entry duplicate.

With more details, entry duplicate removing step 1100 consists in successively traversing each entry 'i' of the texture coordinates table 51 (step 1101 together with the loop to this step) and searching for entry duplicates thereof in the remainder of the texture coordinates table (e.g. the part from the entry being traversed). Step 1102 with the loop to this step consists in successively considering each remaining texture coordinates subsequent to the current position 'i', which is followed by test 1103 which compares the current texture coordinates TextC[i][0] and TextC[i][1] to the subsequent texture coordinates considered TextC[j][0] and TextC[j][1] respectively.

If the pairs of texture coordinates are the same, the subsequent texture coordinates is considered as being a duplicate of the current texture coordinates, and thus the corresponding entry (i.e. having the index 'j') is deleted from table 51. For instance, the corresponding entry may be set to a Null or specific value: TextC[j][0]=TextC[j][1]=−1 in the example. Also, the mapping table 'map' is updated to memorize the references to the deleted entry should be replaced by a reference to the current texture coordinates 'i': map[j]=i. This is step 1104. Thanks to the loop to step 1102, all the entries which are duplicates of the current texture coordinates are deleted from table 51. Only the current texture coordinates are a kept entry in the table.

At this end of step 1100, map[i]=i for all the kept entries, and map[i]=j≠i for all the deleted entries (j is the index of the kept entry having the same texture coordinates).

FIG. 12 illustrates the process of FIG. 11 on a specific example of texture mapping data 216. Arrow 1100 illustrates the above step 1100: in this example entries with indexes 4, 5, 8 and 9 have been deleted because they are entry duplicates of entries having lower indexes.

Once all the entry duplicates have been deleted, texture coordinates indexes updating 1110 consists in successively traversing each entry 'i' of the texture coordinates indexes table/list 50 (step 1111) to change the texture coordinates indexes TextIndex[i] given the mapping stored in variable 'map' (step 1112).

For instance, as illustrated in FIG. 12, as initial entry 4 was a duplicate of entry 2 and thus was deleted, map[4] was set to 2. During step 1110 (arrow 1110 in the Figure), all occurrences of index '4' are substituted with index '2' of the kept entry. The same is done for deleted indexes 5, 8 and 9, respectively replaced by indexes 1, 6 and 7.

Next, the texture coordinates table 51 is simplified to avoid holes (empty entries), by reassigning successive entry indexes to the kept entries. Variable 'j' to progressively build the new texture coordinates table 51 is initially set to 0 (step 1121) to designate the very first entry of this table.

All entries 'i' of the tables are successively considered (step 1122). Next, it is checked (step 1123) whether the entry so considered has been deleted (for instance only component TextC[i][0] may be compared to the Null or specific value (here '−1')) or not.

In case the entry has not been deleted, it is overwritten on entry T (step 1124) and j is incremented. Note that 'i' increases faster than 'j', thus ensuring the overwriting does not erase relevant entries. As the entries moves (and thus the indexes to them change) the resulting index mapping is also stored in variable 'map': map[i]=j.

At the end, 'j' stores the number of kept entries.

In FIG. 12, step 1120 is shown through arrow 1120. The five kept entries as shown are grouped at the beginning of the texture coordinates table 51, i.e. with successive indexes.

The index mapping is then mirrored in the texture coordinates indexes table 50 through step 1130 which successively considers each texture coordinates indexes of rank i TextIndex[i] (step 1131) and updates it by its mapping value map[TextIndex[i]] (step 1131).

FIG. 12 illustrates this indexes updating step 1130 through arrow 1130. For instance texture coordinates entry 6 is moved to entry 4 during step 1120. This texture coordinates index equal to 6 is changed into the value 4.

The description above set the texture coordinates of the entry duplicates to a Null or specific value ('−1' in the example) at step 1104. This Null or specific value is used in step 1120 to clean the texture coordinates table 51 by actually removing the deleted entries. In a variant, step 1104 may not set the Null or specific value and may only set the mapping table for vertex 'j', to lighten the process in step 1100. In that case, the cleaning 1120 of table 51 may consist in identifying which index of table 51 is no longer present in the mapping table: these indexes correspond to deleted entry duplicates and can be actually removed from the table. The remaining entries may be next reordered with successive indexes.

The texture coordinates indexes table and the texture coordinates table so generated can then be encoded using steps 710 and 712 (using table 711) and 713 described above.

The second embodiments advantageously do not require modification of the SC3DMC standard. An additional advantage to those defined above is that the decoded 3D object (RAW file) has a lower rate than the input 3D object because it contains less data. This can be useful for some applications. The second embodiments can be applied on the RAW file directly.

Compared to the first embodiments described above, the second embodiments may also apply when condition 815 is not satisfied.

In embodiments, the texture coordinates resulting from this process are preferably encoded using the parallelogram prediction.

Figure 13:
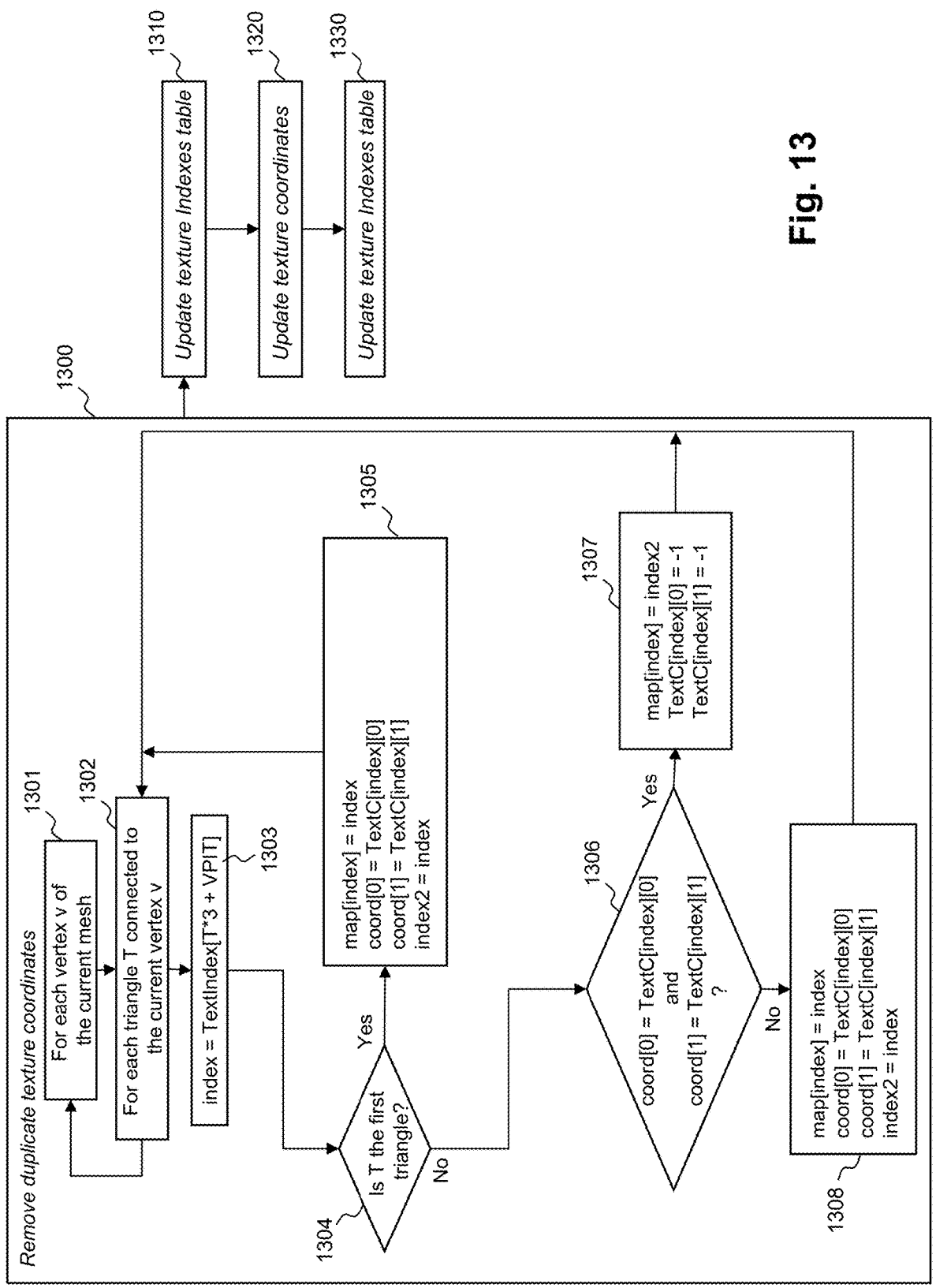
FIG. 13 illustrates, using a flowchart, third embodiments of the invention performing entry duplicate deletions using connectivity data.

With reference to FIG. 13, the third embodiments (as well as the fourth embodiments below) use the connectivity data to determine the entry duplicates. This is to reduce the encoding complexity (and thus runtime), as the duplicate search may be restricted to few entries (compared to the comparison 1103 to all the entries of the texture coordinates table 51 in the second embodiments).

The third embodiments (as well the fourth ones) rely on the same process _ four main steps 1100, 1110, 1120, 1130 _ but with use of connectivity data to reduce complexity during the first step. As shown in FIG. 13 illustrating, using a flowchart, the process, these four steps are renumbered 1300, 1310, 1320, 1330.

With reference to FIG. 6, connectivity data 212 provide fan portions (one is shown) made of a contiguous series of triangles having a vertex in common. In this example, each triangle T0, T1, T2, T3, T4, T5, T6 is connected to a vertex currently considered, here vertex '1'. The idea of the third (and fourth) embodiments is to use the connectivity data to identify all these triangles that share (as a vertex) the vertex currently considered. Thus, a search of duplicates of texture coordinates for this vertex currently considered may be performed by only comparing the texture coordinates from amongst the identified triangles. As for the second embodiments, once entry duplicates are identified, they are removed from table 51 and the corresponding texture coordinates indexes table 51 is updated.

To achieve this idea, the duplicate deleting step 1310 includes:

successively considering each vertex of the textured 3D mesh model, determining a plurality of polygons (triangles in the example), preferably all the polygons, that share the vertex currently considered as a polygon vertex (i.e. polygons connected to the considered vertex). The determining is made using the obtained connectivity data, and determining one or more entry duplicates within only the set of entries associated, in the texture coordinates table, with the vertex currently considered in the determined polygons (i.e. only the entries corresponding to the vertex currently considered are retrieving and used for the determining).

In details as shown in FIG. 13, an implementation of duplicate deleting step 1310 includes, for each vertex 'v' of the 3D mesh model (step 1301), identifying and parsing each connected triangle 'T' (1302), i.e. having 'v' as a vertex. This is done using the connectivity data 212.

Variable 'index' is set equal to the texture coordinates index of 'v' belonging to 'T' (1303). In short, as one texture coordinates index is provided for each vertex of each triangle (made of 3 vertices), the texture coordinates index of 'v' belonging to 'T' is set to 3*T+VPIT, where T is the position of the triangle in the list of triangles according to the connectivity order and VPIT is the vertex position within the triangle (still according to the connectivity order).

Test 1304 checks whether currently-processed triangle T is the first one, according to the connectivity order, considered from amongst the triangles determined at step 1302. This is because the texture coordinates of 'v' for this first triangle will be used as reference coordinates for the duplicate search. To that extend, the mapping table 'map' (still used to store the mapping between the 'old' texture coordinates indexes before entry duplicate deletion and the texture coordinates indexes to be used in replacement) for vertex 'v' (i.e. entry with index equal to variable 'index') is set to 'index' in order to save this entry of the texture coordinates table 51 has to be kept (because it is a reference one). Also variable 'coord' is set to the texture coordinates of vertex 'v' currently considered in triangle T in order to be used as reference coordinates in test 1306 described below. The index 'index' of this reference coordinates is also saved in a reference index labelled 'index2'. These initial settings are made at step 1305. Next to step 1306, the process loops back to step 1302 in order to consider the next triangle of the set of triangles connected to 'v'.

On the other hand, if the currently-processed triangle T is not the first one, test 1306 is performed in which the texture coordinates of vertex 'v' currently considered in triangle T are compared to the reference coordinates.

If the two sets of coordinates perfectly match, the entry associated with vertex 'v' currently considered is considered as being an entry duplicate of the reference entry. In that case, step 1307 is performed in which the entry duplicate is removed. This may be done by setting the mapping table 'map' for vertex 'v' to the reference index 'index2': map[index]=index2; and by, optionally, setting the entry associated with vertex 'v' currently considered to a Null or specific value: e.g. TextC[index][0]=TextC[index][1]=−1 (see the second embodiments above for the adaptation of step 1320 in case the Null or specific value is not used). Next to step 1307, the process loops back to step 1302 in order to consider the next triangle of the set of triangles connected to 'v'.

If the two sets of coordinates do not match, it means the entry associated with vertex 'v' currently considered is not a duplicate of the reference entry. In that case, this entry must be kept in the table of texture coordinates. This is done by setting the mapping table 'map' for vertex 'v' to its own index: map[index]=index. This is step 1308. Next to step 1308, the process loops back to step 1302 in order to consider the next triangle of the set of triangles connected to 'v'.

In some embodiments, the reference entry (reference coordinates) is kept unchanged when comparing, to the reference entry, all the entries associated with vertex 'v' of the triangles connected to 'v'. It means the same reference coordinates are used throughout the loops to step 1302 (i.e. when successively considering all the triangles connected to current vertex 'v').

In other embodiments, the reference entry is updated each time a new entry associated with vertex 'v' of one of the triangles connected to 'v' is different from the reference entry (i.e. each time a new entry is determined as not being a duplicate of the current reference entry), by substituting the reference entry with the new entry. For instance, as shown in the Figure, step 1308 further includes setting variable 'word' to the texture coordinates of vertex 'v' currently considered in triangle T in order to use it as new reference coordinates in the next occurrence of test 1306. Reference index 'index2' is also updated with the index 'index' of vertex 'v' currently considered.

Other embodiments may seek to remove all the entry duplicates. In that case, the texture coordinates of 'v' for the first triangle and the other texture coordinates determined as not being duplicates (output 'no' at test 1306) may be used as sets of reference coordinates for the next occurrences of test 1306 (only for vertex 'v' currently considered). It means that the entries associated with vertex 'v' of the triangles connected to 'v' are compared to each reference entry of the set of reference entries so built (i.e. the set of reference entries is supplemented by each new and compared entry associated with vertex 'v' of one of the triangles connected to 'v' that is different from the reference entry or entries already existing.

Once the texture coordinates indexes table and the texture coordinates table have been updated (steps 1310, 1320, 1330), they can then be encoded using steps 710 and 712 (using table 711) and 713 described above.

These other embodiments (with update of the reference entry) advantageously improve coding efficiency. Indeed, consecutives triangles in the fan portions have usually neighboring texture triangles in the texture image. Thus, since the triangles are successively considered (1302) according to the connectivity order, a change of texture coordinates for the vertex in common probably means that a new part of the texture image is explored. Thus the update of the reference entry increases the chances to find and remove additional entry duplicates.

While the third embodiments have the same advantages as the second embodiments, they further reduce encoding complexity. This is because the number of comparisons 1306 is only equal to the valence minus 1.

To be noted that the bitstream generated with the third embodiments is different to the bitstream generated with the second embodiments, in the majority of cases (except when the number of non-duplicate coordinates is strictly equal to the number of vertices).

Figure 14:
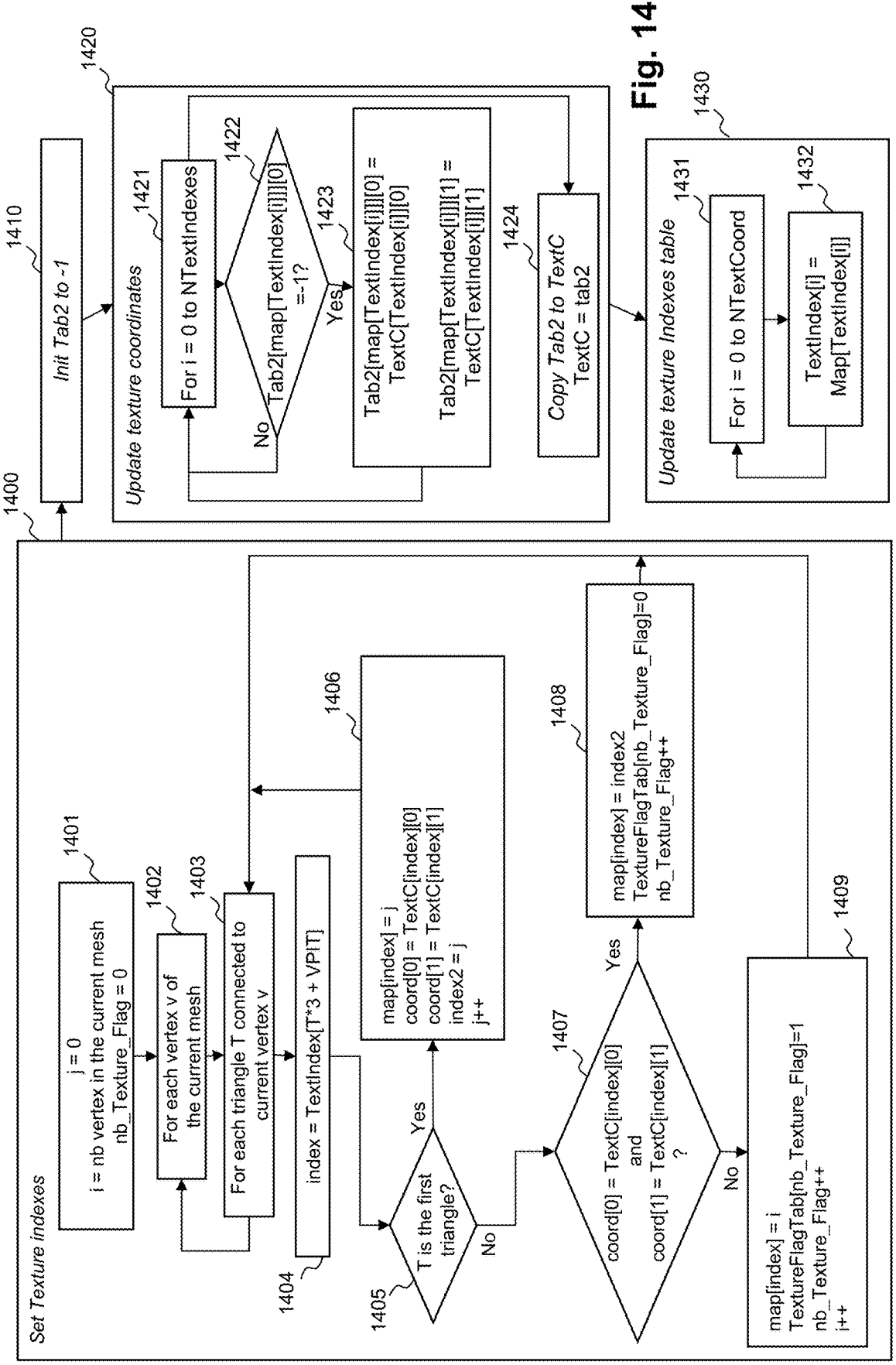
FIG. 14 illustrates, using a flowchart, fourth embodiments of the invention that improve the third embodiments of FIG. 13 by building a texture flagging table.
Figure 15:
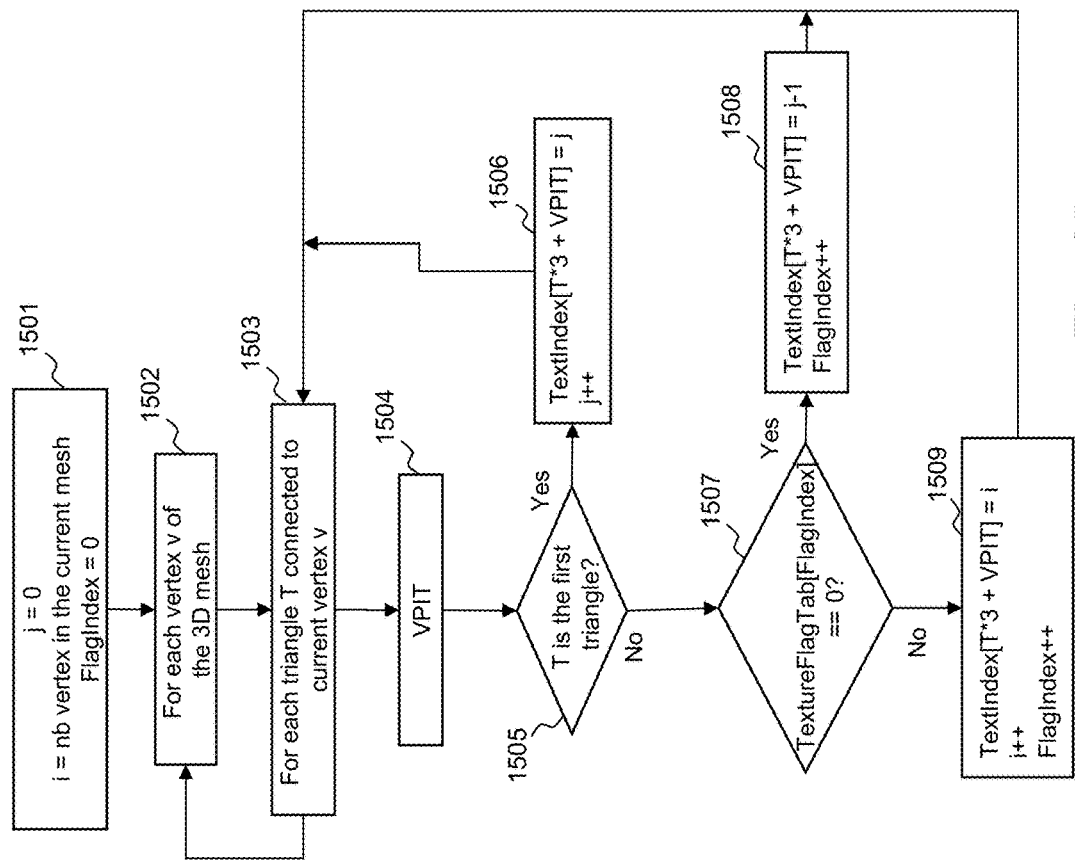
FIG. 15 illustrates, using a flowchart, an exemplary decoding method for the fourth embodiments relying on the use of the texture flagging table.

With reference to FIGS. 14 and 15, the fourth embodiments also use the connectivity data to determine the entry duplicates. More precisely, the fourth embodiments exploit the redundancies between the connectivity data and the texture indexes.

The correlation between the connectivity data and the texture indexes transpires from the examples of FIG. 10. The part of the texture image 61 that is mapped onto the 3D mesh model is usually made of one piece (top of FIG. 10) or several pieces of textures (bottom of FIG. 10).

In the example in the top of FIG. 10 with a 3D object that is not closed, the texture image 61 contains a single piece of texture. The periphery of the single piece of texture in the image corresponds to the outer edge of the 3D object. Consequently, when the texture mapping data 216 are correctly reordered (according to the connectivity data _ meaning the texture triangles are traversed within the texture image 61 following the same order as for the traversal of the triangles in the 3D object), the texture coordinates indexes can be the same as the connectivity indexes: each vertex in the 3D object has a single vertex in the texture image 61.

In the example in the bottom of FIG. 10, the 3D object is closed and several pieces of texture (within texture image 61) are needed. The bold lines in the 3D object schematically illustrates an example of cutting the 3D object envelope into several portions, and correspond to the periphery of the pieces of texture in the texture image. In that case, the mesh connectivity is similar to the texture connectivity except for these green parts: each vertex forming the cutting bold lines in the 3D object have two or more vertices in the texture image 61.

Based on this observation, proposed fourth embodiments seek to flag the texture coordinates indexes corresponding to the same vertex 'v' in the 3D object in order to indicate (preferably for all indexes except the first occurrence corresponding to vertex 'v') whether it corresponds to the same vertex in the texture image as a reference vertex (preferably the one associated with the first occurrence corresponding to vertex 'v') or to another vertex in the texture image. This corresponds to indicate whether the triangle currently considered belongs to the same texture portion as the reference vertex in the texture image, or to another texture portion. The flags thus signal where the texture connectivity is the same as the mesh connectivity. They make it possible to avoid having entry duplicates of the reference entry (corresponding to the reference vertex) in the texture coordinates For instance, a new and replacing texture coordinates tables may be built when performing the flagging, in which only a single (reference) entry for the reference vertex is included.

As a consequence, the flags may replace the texture coordinates indexes in the bitstream, thereby saving bits.

This approach requires the method of the fourth embodiments include building a texture flagging table having, for each vertex successively considered, one or more flags (preferably single bits) associated with one or more polygons of the corresponding determined plurality of polygons, wherein the flag for a polygon is set to a first value when the entry associated with the shared vertex currently considered in the polygon is a duplicate of at least one reference entry. This signal when the same vertex in a new triangle of the 3D mesh model has the same texture coordinates as the reference vertex, or another value otherwise, to signal when the vertex in the current triangle has other texture coordinates than the reference ones. Preferably, the flags are one-bit flags, in which case a single other value is used to signal the non-duplicate entries (compared to the reference entry). In the example of FIG. 14 discussed below, the value '0' is used to indicate that the texture coordinates index is the same as the index associated with the reference entry, and the value '1' is used to indicate that the texture coordinates index is different from the reference index.

As each triangle in the 3D mesh model has at least one texture coordinates, it is not necessary to provide a flag for all the triangles sharing the same vertex. As mentioned above, the reference entry may be initially set to the one associated with the first triangle traversed using the connectivity order. In that case, no flag is provided in the texture flagging table for each first polygon of the determined pluralities of polygons given the connectivity order. Furthermore, flags may be provided in the texture flagging table for all and only the polygons of the corresponding determined plurality of polygons different from the first polygon in said determined plurality of polygons given the connectivity order.

As the texture flagging table still mirrors the texture connectivity between the texture coordinates indexes, when the texture coordinates are modified accordingly (i.e. entry duplicates of the reference entry being deleted), encoding the texture coordinates indexes may include substituting the texture coordinates indexes with the texture flagging table.

As for the third embodiments, the reference entry may be kept unchanged when considering all the triangles sharing the vertex currently considered, or may be updated. Also a set of reference entries may be used, in which case the flag is adapted to allow indicating for each triangle newly processed which reference entry matches its own texture coordinates.

FIG. 14 illustrates, using a flowchart, exemplary fourth embodiments of the encoding method. This process has similarities with the one of FIG. 13 because the third and fourth embodiments share similar principles.

Four mains steps 1400, 1410, 1420, 1430 are still present.

Variable 'TextureFlagTab' is used to store the texture flagging table. Index 'nb_Texture_Flag' makes it possible to follow the growing-up of this table.

Step 1400 makes it possible to delete the entry duplicates as well as to set the texture flagging table. To actually remove the deleted entry duplicates, these exemplary embodiments builds a replacing texture coordinates table by adding therein each entry newly considered that is different from the current reference entry (which evolves as the vertices are successively considered, and replaces the texture coordinates table by the build replacing texture coordinates table for encoding in the bitstream. This building is prepared during step 1400 and finalized during step 1420, using a table initialized during step 1410. Step 1430 updates the texture coordinates indexes if necessary.

The approach proposed for building the replacing texture coordinates table is to build a starting part of the replacing texture coordinates table, made of a copy of one entry per each vertex successively considered in the textured 3D mesh model. This starting part is filled in progressively as the vertices are successively considered according to the connectivity order. Preferably the entry associated with the first triangle of the plurality of triangles sharing the same vertex 'v' is used. A variable 'j' is used to follow this progression, and build an ending part of the replacing texture coordinates table, made of a copy of entries of the texture coordinates table that are not determined as being duplicates of the entries forming the starting part. Thus the entries forming the starting part (one per each vertex) may be seen as the reference entries discussed above. To follow the growing-up of this ending part, a variable 'i' is used.

An initial step 1401 step sets 'nb_Texture_Flag' to 0, 'j' to 0 and 'i' to the number of vertices in the 3D mesh model (because the ending part directly follows the starting part which provides a single entry for each vertex of the 3D mesh model).

As for FIG. 13, each vertex 'v' and each triangle 'T' sharing 'v' are successively considered (steps 1402-1403) and the index of the current vertex 'v' in current 'T' is set (step 1404).

Again, if 'T' is the first triangle (test 1405), the entry associated with vertex 'v' of that triangle 'T' is set as a reference entry, and its index is saved as the reference index 'index2'. Also, the mapping table 'map' saves value 'j' for the current index. This is to save the fact that the entry associated with the current index is dedicated to take the i-th position in the starting part of the replacing texture coordinates table. 'j' is incremented. This is step 1406. Next to step 1406, the process loops back to step 1403 in order to consider the next triangle of the set of triangles connected to 'v'.

When 'T' is a subsequent triangle (test 1405), the texture coordinates of vertex 'v' currently considered in triangle T are compared to the reference coordinates. This is to detect entry duplicates (step 1407).

In case of entry duplicate, step 1408 now maps the current index to the reference index: map[index]=index2, and memorizes the fact that the texture coordinates for vertex 'v' in the current triangle 'T' (according to the connectivity order) is the same as the reference coordinates by setting the corresponding flag in the texture flagging table to the value '0': TextureFlagTab[nb_Texture_Flag]=0. 'nb_Texture-Flag' is incremented. Next to step 1408, the process loops back to step 1403 in order to consider the next triangle of the set of triangles connected to 'v'.

In case of different texture coordinates, the texture coordinates of vertex 'v' currently considered in triangle T are texture coordinates additional to the reference coordinates saved at step 1406. As it is not an entry duplicate, the corresponding flag in the texture flagging table is set to the value '1': TextureFlagTab[nb_Texture_Flag]=1. 'nb_Texture-Flag' is incremented. Also, the mapping table 'map' saves value 1' for the current index. This is to save the fact that the entry associated with the current index is dedicated to take the j-th position in the replacing texture coordinates table (i.e. in the ending part). 'i' is incremented. This is step 1409. Next to step 1409, the process loops back to step 1403 in order to consider the next triangle of the set of triangles connected to 'v'.

Note that step 1409 in the illustrating Figure does not make it possible to handle (and delete) entry duplicates of the entries already stored in the ending part of the replacing texture coordinates table. That is why the flag is set to '1' (which only indicates it is not a duplicate of the reference entry). However, such entry duplicates may be handled by supplementing a set of reference entries as suggested above, and by using flags designed to indicate of which reference entry of the set the current entry is a duplicate.

At the end of this process variable nb_Texture_Flag is less than to the number of textures coordinates indexes. More precisely, it is equal to 'j', the number of texture coordinates indexes minus the number of vertices in the 3D mesh model. In replacement of the texture coordinates indexes, the number of flags nb_Texture_Flag is inserted in the bitstream and the flags are encoded based on the arithmetic coding for example.

Next the tables containing the texture coordinates and texture coordinates indexes are updated (1410, 1420, 1430). Variable Tab2 is used to store the replacing texture coordinates table. The size of this table is i−1 (as obtained at the end of 1400), made of j−1 entries in the starting table and i−j entries in the ending part. Tab2 is initialized to −1 at step 1410.

Step 1420 actually builds the replacing texture coordinates table given the mapping table 'map' built during step 1400. As built, map[ ] gives values between 0 and i−1 (as obtained at the end of 1400).

The mapping table must be traversed for all the texture coordinates indexes. Variable 'i' is accordingly incremented from 0 (step 1421).

It is thus checked whether the entry of Tab2 with index equal to map[TextIndex[i]] has already been set (test 1422). In the affirmative, the process tests a next index by looping back to step 1421. In the negative, it is set by copying the entry initially associated with index TextIndex[i]: Tab2[map [TextIndex[i]]]=TextC[TextIndex[i]]. This is step 1423, looping back to step 1421.

Once all the texture coordinated indexes have been traversed, replacing texture coordinates table Tab2 actually replaces the initial texture coordinates table (step 1424).

Next, step 1430 provides the updating of the texture coordinates indexes given the mapping table 'map' (steps 1431 and 1432). This is to regenerate the appropriate (and improved given the duplicate removal) texture connectivity for instance if the texture coordinates are connectivity-based encoded (e.g. using the parallelogram predictor). For the decoder to be able to perform the corresponding connectivity-based decoding, the texture connectivity data (i.e. TFAN variables produced by encoding and decoding the texture indexes) can be inferred from the received flags. Yet, except the flags, no information is inserted in the bitstream.

In the fourth embodiments, the texture flagging table will be used by the decoder (see below with reference to FIG. 15) to rebuilt the texture coordinates indexes. It means that the texture coordinates may keep the order of the indexes in the texture flagging table. Since the order of the latter is not modified during its encoding in the bitstream (no TFAN encoding 710 is used), the texture coordinates do not need to be reordered (step 712) using table 711 (which cannot be produced because step 710 is not performed).

For instance the flags of the texture flagging table are encoded using an arithmetic coding, while the texture coordinates table is encoded using step 713.

In some embodiments where it is determined the mesh connectivity (as defined in connectivity data 212) is the same as the texture connectivity (as defined in the texture coordinates indexes 50), it is noted that each vertex in the 3D mesh model has a single corresponding vertex in the texture image (see top of FIG. 10). In that case, all the flags in the texture flagging table are necessarily equal to 0. Thus, instead of encoding the texture flagging table, a specific signaling of this situation (identical connectivities) may be provided in the bitstream. This saves bitrate.

While the fourth embodiments have the same advantages as the third embodiments, they further improve coding efficiency for texture indexes.

When the texture connectivity exactly matches the mesh connectivity (see top of FIG. 10), the coding gain is close to 100% compared to the SC3DMC standard. When the texture image contains a reasonable number of pieces of texture, the gain is on average close to 97%. Otherwise, the gain is lower. However, it remains largely higher than the gain achieved with the third embodiments.

As far as the texture coordinates are concerned, the coding gain is similar to the one achieved with the second and third embodiments.

FIG. 15 illustrates, using a flowchart, an exemplary decoding method for the fourth embodiments relying on the use of the texture flagging table.

Usually a method for decoding and rendering a bitstream into a textured three-dimensional mesh model composed of polygons between connected vertices, comprises the following steps:

obtaining, from the bitstream, connectivity data describing the connectivity between the vertices in the textured 3D mesh model, obtaining, based on the bitstream, texture data including a texture image, including a texture coordinates table having entries, each entry defining a set of coordinates in the texture image, and including texture coordinates indexes associating each vertex of a polygon in the textured 3D mesh model with an entry in the texture coordinates table, and rendering the textured 3D mesh model using the obtained connectivity and texture data.

The texture image is decoded using conventional techniques. Similarly, the texture coordinates table is decoded.

Due to the encoding of the texture flagging table by the encoder (instead of the texture coordinates indexes themselves), obtaining, from the bitstream, the texture coordinates indexes requires, in the exemplary embodiment:

decoding a texture flagging table from the bitstream, successively considering each vertex of the textured 3D mesh model according to a connectivity order inferred from the obtained connectivity data to build a texture coordinates indexes table.

To build the table, several steps can be performed for each vertex currently considered. First, the polygons that shares the vertex currently considered as a polygon vertex are determined. This is to mirror the order for consideration as used at the encoder (step 1403). Next, one or more flags associated with one or more polygons of the determined polygons are read from the decoded texture flagging table. This gives the indication for each next index to be produced of whether it should mirror a reference index (because the corresponding vertex in the texture image is the same as the reference vertex) or should takes a new value (because it corresponds to a new vertex in the texture image). As done at the decoder through variable 'i' of step 1400, the new value may be a moving index being initialized with the number of vertices in the textured 3D mesh model and being incrementing each time a read flag takes the other value. Thus, an index associated with the vertex currently considered in each of the one or more polygons is set in the texture coordinates indexes table based on the respective read flag. To mirror the operations at the decoder, a flag may be read from the decoded texture flagging table for each polygon of the determined polygons, except the first polygon of the determined polygons given the connectivity order.

As for the encoder, variables 'i', 'j' are initialized to 0. 'i' is used to browse the indexes corresponding to the ending part of the texture coordinates table, while 'j' is used to browse the indexes of the starting part. Also, a variable 'FlagIndex' is initialized to 0 and will be used to parse the decoded texture flagging table. This is step 1501.

Like the encoder did, each vertex 'v' and each triangle 'T' sharing 'v' are successively considered (steps 1502-1503) and the position VPIT of the current vertex 'v' within current 'T' is retrieved (step 1504).

Again, if 'T' is the first triangle (test 1505), the texture coordinates associated with vertex 'v' for triangle 'T' are the next one in the starting part of the decoded texture coordinates table. Thus, the index for position T*3+VPIT is set to j, and j is incremented (step 1506). Next to step 1506, the process loops back to step 1503 in order to consider the next triangle of the set of triangles connected to 'v'.

When 'T' is a subsequent triangle (test 1505), it is determined (test 1507) whether the corresponding flag in the texture flagging table indicates vertex 'v' for triangle 'T' has the same texture coordinates as the reference coordinates (at index j−1) or indicates it has new texture coordinates (i.e. the next entry in the ending part of the texture coordinates table).

The corresponding flag is the next flag in the texture flagging table being parsed, i.e. flag at position FlagIndex.

If the read flag is '0', the index for vertex 'v' for triangle 'T' must be the reference index (here 'j−1'). FlagIndex is also incremented (to go on parsing the texture flagging table. This is step 1508 followed by step 1503 in order to consider the next triangle of the set of triangles connected to 'v'.

If the read flag is another value (e.g. '1'), the texture coordinates associated with vertex 'v' for triangle 'T' are the next one in the ending part of the decoded texture coordinates table. Thus, the index for position T*3+VPIT is set to i. 'i' and 'FlagIndex" are incremented. This is step 1509 followed by step 1503 in order to consider the next triangle of the set of triangles connected to 'v'.

Figure 16:
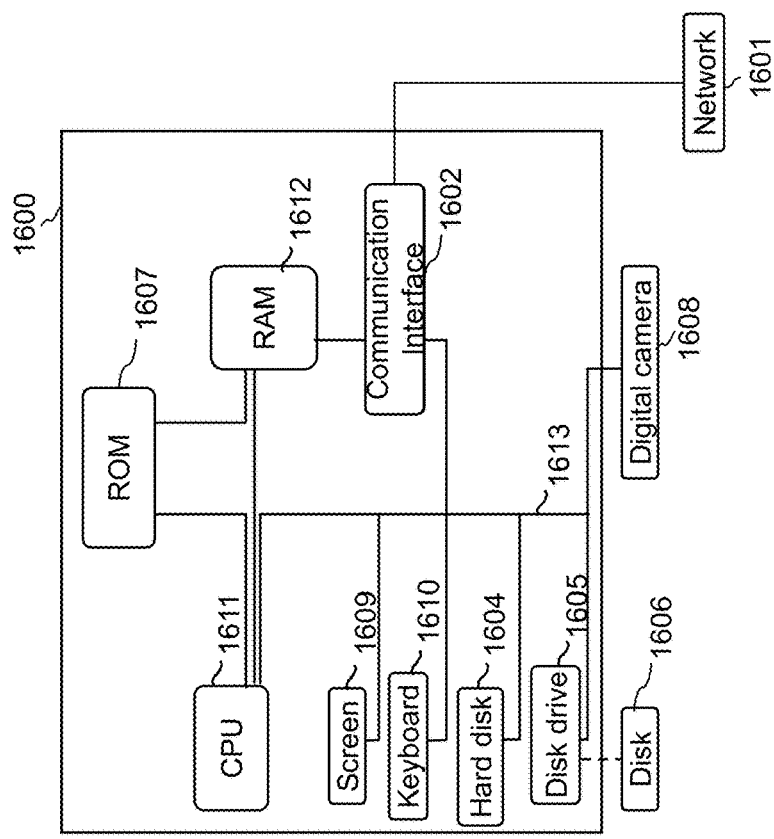
FIG. 16 shows a schematic representation a device in accordance with embodiments of the present invention.

FIG. 16 schematically illustrates a device 1600 to implement at least one embodiment of the present invention. The device 1600 may preferably be a device such as a microcomputer, a workstation or a light portable device. The device 1600 comprises a communication bus 1613 to which there are preferably connected:

a central processing unit 1611, such as a microprocessor, denoted CPU;

a read only memory 1607, denoted ROM, for storing computer programs for implementing the invention;

a random access memory 1612, denoted RAM, for storing the executable code of methods according to embodiments of the invention as well as the registers adapted to record variables and parameters necessary for implementing methods according to embodiments of the invention; and at least one communication interface 1602 connected to a communication network 1601 over which data may be transmitted.

Optionally, the device 1600 may also include the following components:

a data storage means 1604 such as a hard disk, for storing computer programs for implementing methods according to one or more embodiments of the invention;

a disk drive 1605 for a disk 1606, the disk drive being adapted to read data from the disk 1606 or to write data onto said disk;

a screen 1609 for displaying data and/or serving as a graphical interface with the user, by means of a keyboard 1610 or any other pointing means.

The device 1600 may be optionally connected to various peripherals, such as for example a digital camera 1608, each being connected to an input/output card (not shown) so as to supply data to the device 1600.

Preferably the communication bus provides communication and interoperability between the various elements included in the device 1600 or connected to it. The representation of the bus is not limiting and in particular the central processing unit is operable to communicate instructions to any element of the device 1600 directly or by means of another element of the device 1600.

The disk 1606 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 1607, on the hard disk 1604 or on a removable digital medium such as for example a disk 1606 as described previously. According to an optional variant, the executable code of the programs can be received by means of the communication network 1601, via the interface 1602, in order to be stored in one of the storage means of the device 1600, such as the hard disk 1604, before being executed.

The central processing unit 1611 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 1604 or in the read only memory 1607, are transferred into the random access memory 1612, which then contains the executable code of the program or programs, as well as registers for storing the variables and parameters necessary for implementing the invention.

In a preferred embodiment, the device is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for encoding a textured three-dimensional mesh model into a bitstream, the textured 3D mesh model being composed of polygons between connected vertices, the method comprising the steps of obtaining texture data and of encoding the texture data in a bitstream, the texture data including:
a texture image,
a texture coordinates table having entries, each entry defining a set of coordinates in the texture image, and texture coordinates indexes associating each vertex of a polygon in the textured 3D mesh model with an entry in the texture coordinates table,
wherein the method further comprises deleting entry duplicate or duplicates from the texture coordinates table before encoding the texture coordinates table,
wherein the method further comprises obtaining connectivity data describing the connectivity between the vertices in the textured 3D mesh model,
wherein deleting entry duplicate or duplicates is based on the obtained connectivity data and includes:
successively considering each vertex of the textured 3D mesh model,
determining a plurality of polygons, preferably all the polygons, that share the vertex currently considered as a polygon vertex using the obtained connectivity data, and
determining one or more entry duplicates within only the set of entries associated, in the texture coordinates table, with the vertex currently considered in the determined polygons.

2. The method of claim 1, further comprising substituting the texture coordinates index associated with a deleted entry duplicate with the texture coordinates index associated with a kept entry that is identical to the deleted entry duplicate.

3. The method of claim 1, wherein deleting entry duplicate or duplicates further includes, once the entry duplicates have been deleted from the texture coordinates table, assigning successive entry indexes to the remaining entries in the texture coordinates table.

4. The method of claim 3, wherein deleting entry duplicate or duplicates further includes updating the texture coordinates indexes to mirror the changes in the entry indexes of the remaining entries in the texture coordinates table.

5. The method of claim 1, further comprising building a texture flagging table having, for each vertex successively considered, one or more flags associated with one or more polygons of the corresponding determined plurality of polygons, wherein the flag for a polygon is set to:
a first value when the entry associated with the shared vertex currently considered in the polygon is a duplicate of at least one reference entry, or another value otherwise,
wherein encoding the texture coordinates indexes includes substituting the texture coordinates indexes with the texture flagging table.

6. The method of claim 5, wherein flags are provided in the texture flagging table for all and only the polygons of the corresponding determined plurality of polygons different from the first polygon in said determined plurality of polygons given a connectivity order inferred from the obtained connectivity data.

7. The method of claim 5, wherein no flag is provided in the texture flagging table for each first polygon of the determined pluralities of polygons given the connectivity order.

8. The method of claim 5, wherein the reference entry is initially set to the entry associated the vertex currently considered in the first, according to a connectivity order inferred from connectivity data of the textured 3D mesh model, polygon considered from amongst the determined polygons.

9. The method of claim 1, wherein deleting entry duplicate or duplicates further includes building a replacing texture coordinates table by adding therein each entry newly considered from the set of entries during the entry duplicate determining step, that is different from at least one reference entry, and replacing the texture coordinates table by the build replacing texture coordinates table for encoding in the bitstream.

10. The method of claim 9, wherein building a replacing texture coordinates table includes:

building a starting part of the replacing texture coordinates table, made of a copy of one entry per each vertex successively considered in the textured 3D mesh model, and building an ending part of the replacing texture coordinates table, made of a copy of entries of the texture coordinates table that are not determined as being duplicates of the entries forming the starting part, wherein, for each vertex successively considered in the textured 3D mesh model, the determined polygons are successively considered using a connectivity order inferred from the obtained connectivity data, to determine the entry duplicates, and the starting part of the replacing texture coordinates table includes the entry associated with each vertex currently considered that belongs to the first polygon of the determined polygons given the connectivity order.

11. The method of claim 1, further comprising obtaining a list of fan portions describing the connectivity between the vertices in the textured 3D mesh model, each fan portion being made of successive vertices that form together a contiguous series of one or more triangles having in common the vertex currently considered, and the determined polygons are triangles successively considered using the order of the triangles in the series of the one or more fan portions, to determine the entry duplicates.

12. The method of claim 1, wherein deleting entry duplicates includes successively traversing each entry of the texture coordinates table and searching for entry duplicates thereof in the remainder of the texture coordinates table.

13. A device for encoding a textured three-dimensional mesh model into a bitstream, the textured 3D mesh model being composed of polygons between connected vertices, the device comprising at least one microprocessor configured for carrying out steps of obtaining texture data and of encoding the texture data in a bitstream, the texture data including:

a texture image, a texture coordinates table having entries, each entry defining a set of coordinates in the texture image, and texture coordinates indexes associating each vertex of a polygon in the textured 3D mesh model with an entry in the texture coordinates table, wherein the device is configured to delete entry duplicate or duplicates from the texture coordinates table before encoding the texture coordinates table, wherein the device is further configured to obtain connectivity data describing the connectivity between the vertices in the textured 3D mesh model, wherein deleting entry duplicate or duplicates is based on the obtained connectivity data and includes:

successively considering each vertex of the textured 3D mesh model, determining a plurality of polygons, preferably all the polygons, that share the vertex currently considered as a polygon vertex using the obtained connectivity data, and determining one or more entry duplicates within only the set of entries associated, in the texture coordinates table, with the vertex currently considered in the determined polygons.

* * * * *